(12) United States Patent
De Oliveira

(10) Patent No.: US 10,551,218 B2
(45) Date of Patent: Feb. 4, 2020

(54) CAPACITIVE DETECTION, ENERGY TRANSFER, AND/OR DATA TRANSFER SYSTEM

(71) Applicant: PRAGMATIC PRINTING LIMITED, Co Durham (GB)

(72) Inventor: Joao De Oliveira, Cambridgeshire (GB)

(73) Assignee: PRAGMATIC PRINTING LIMITED, Sedgefield, Co Durham (GB)

(*) Notice: Subject to any disclaimer, the term of this patent is extended or adjusted under 35 U.S.C. 154(b) by 414 days.

(21) Appl. No.: 15/313,455

(22) PCT Filed: May 26, 2015

(86) PCT No.: PCT/GB2015/051528
§ 371 (c)(1),
(2) Date: Nov. 22, 2016

(87) PCT Pub. No.: WO2015/177576
PCT Pub. Date: Nov. 26, 2015

(65) Prior Publication Data
US 2017/0138768 A1  May 18, 2017

(30) Foreign Application Priority Data

May 23, 2014 (GB) .................................. 1409182.1
Aug. 21, 2014 (GB) .................................. 1414916.5

(51) Int. Cl.
*G01D 5/241* (2006.01)
(52) U.S. Cl.
CPC .................................. *G01D 5/2412* (2013.01)
(58) Field of Classification Search
None
See application file for complete search history.

(56) References Cited

U.S. PATENT DOCUMENTS

| 4,835,373 A | 5/1989 | Adams et al. |
| 4,876,535 A | 10/1989 | Ballmer et al. |

(Continued)

FOREIGN PATENT DOCUMENTS

| EP | 2257821 A1 | 12/2010 |
| EP | 2645298 A1 | 10/2013 |

(Continued)

OTHER PUBLICATIONS

GB Search Report for GB1414916.5, dated Feb. 25, 2016; 1 page.

(Continued)

*Primary Examiner* — Jermele M Hollington
*Assistant Examiner* — Suresh K Rajaputra
(74) *Attorney, Agent, or Firm* — Pepper Hamilton LLP

(57) ABSTRACT

A system is disclosed, comprising a base and at least a first moveable entity, the first moveable entity being moveable with respect to the base and positionable in at least a first position with respect to the base. The base comprises a first base electrode and a second base electrode, and the moveable entity comprises a first moveable entity electrode and a second moveable entity electrode. The electrodes are arranged such that when the moveable entity is in the first position the first base electrode and the first moveable entity electrode align to form a first capacitor and the second base electrode and second moveable entity electrode align to form a second capacitor. The first moveable entity further comprises a first resistor connecting the first moveable entity electrode to the second moveable entity electrode, and the base further comprises: signal supply means arranged to supply a time-varying electrical signal to the first base electrode; and signal detection means arranged to detect an electrical signal from the second base electrode.

20 Claims, 16 Drawing Sheets

(56) References Cited

U.S. PATENT DOCUMENTS

| | | | |
|---|---|---|---|
| 5,077,635 | A | 12/1991 | Bollhagen et al. |
| 5,159,181 | A | 10/1992 | Bartels et al. |
| 5,818,019 | A | 10/1998 | Irwin et al. |
| 5,847,447 | A | 12/1998 | Rozin et al. |
| 6,879,809 | B1 | 4/2005 | Vega et al. |
| 8,547,119 | B2 | 10/2013 | Ikuta et al. |
| 2003/0164043 | A1 | 9/2003 | Murata et al. |
| 2007/0084934 | A1 | 4/2007 | Seppa |
| 2009/0015949 | A1 | 1/2009 | Matsuki |
| 2009/0096467 | A1 | 4/2009 | Nielsen et al. |
| 2009/0302690 | A1 | 12/2009 | Kubono et al. |
| 2010/0255777 | A1* | 10/2010 | Kondo ............ G06K 7/081 455/41.1 |
| 2011/0241835 | A1 | 10/2011 | Amtmann et al. |
| 2012/0220838 | A1* | 8/2012 | Zdeblick .......... G06Q 10/06 600/302 |
| 2013/0264661 | A1 | 10/2013 | Tanaka |
| 2015/0211915 | A1* | 7/2015 | Scarlett ............ G01F 23/263 73/304 C |

FOREIGN PATENT DOCUMENTS

| | | |
|---|---|---|
| GB | 1419885 A | 12/1975 |
| GB | 2531694 B | 8/2018 |
| WO | 9714112 A1 | 4/1997 |

OTHER PUBLICATIONS

The International Search Report and Written Opinion for PCT/GB2015/051528, dated Aug. 20, 2015; 13 pages.

Intellectual Property Office Intention to Grant dated Jun. 21, 2018 from corresponding United Kingdom Patent Application No. GB1414916.5, pp. 2.

Intellectual Property Office Search and Examination Report dated Mar. 26, 2018 from corresponding United Kingdom Patent Application No. GB1801672.5, pp. 6.

GB Combined Search and Examination Report for GB1812215.0, dated Sep. 19, 2018; 6 page.

EPO Examination Report Notification under article 94 (3) dated Feb. 12, 2019 from corresponding EP Application No. 157280843, 4 pages.

* cited by examiner

• for RC >> T output:

• for RC ≃ T output:

• for RC << T output:

Mobile

Base

Mobile

Base

Mobile

Base

Example B: Metal container

CAPACITIVE DETECTION, ENERGY TRANSFER, AND/OR DATA TRANSFER SYSTEM

Certain aspects of the present invention generally relate to systems in which it is necessary or desirable to be able to detect when a moveable entity is arranged in a particular position with respect to another entity, such as a base. In particular, although not exclusively, certain aspects of the present invention relate to systems in which it is desirable or necessary to identify the moveable entity when it is located in the predetermined position. Certain aspects additionally, or alternatively, relate to systems in which energy and/or data is transferred between two entities, for example bi-directionally.

BACKGROUND

There are numerous applications in which it is desirable or necessary to be able to detect when a moveable entity is placed in a predetermined position with respect to another entity, such as a base. There are numerous applications where additionally it is necessary or desirable to be able to identify the moveable entity when it is located in the predetermined position, for example where the moveable entity is one of a number of moveable entities that can each be arranged in the predetermined position.

It is known, for example, to use RF ID tags in such applications. Each tag typically comprises a circuit including an inductor and the base is arranged to generate an electromagnetic field in a defined region. When the RF ID tag is brought into that defined region there is inductive coupling between the base and the RF ID tag. This inductive coupling may be arranged to supply energy to the RF ID tag, which may then transmit a signal to the base, that signal enabling the base to identify the particular RF ID tag.

Whilst such tagging systems find a wide variety of applications, they are relatively complex, and the necessity for each tag to include a respective inductor poses challenges both to attempts to reduce the complexity of the system and to reducing the cost of the tags.

BRIEF SUMMARY OF THE DISCLOSURE

Embodiments of the present invention aim to solve, at least partly, at least one of the problems associated with the prior art.

Certain embodiments of the invention aim to provide a simple and low cost system for detecting and identifying a moveable entity placed in a predetermined position with respect to another entity, such as a base.

Certain embodiments aim to provide a system in which the components incorporated in each of a plurality of moveable entities, to enable a base to be able to identify and distinguish between the different moveable entities, consist of simple and low cost components, which may be produced by techniques such as printing, for example.

Certain embodiments aim to provide a system in which the electrical elements in the moveable entity enabling it to be detected and identified by a base, or other entity, do not include any inductor.

A first aspect of the invention provides a system comprising a base (or other first entity) and at least a first moveable entity, the first moveable entity being moveable with respect to the base and positionable in at least a first position with respect to the base, the base comprising a first base electrode and a second base electrode, and the moveable entity comprising a first moveable entity electrode and a second moveable entity electrode, said electrodes being arranged such that when the moveable entity is in said first position the first base electrode and the first moveable entity electrode align to form a first capacitor and the second base electrode and second moveable entity electrode align to form a second capacitor, the first moveable entity further comprising a first resistor connecting the first moveable entity electrode to the second moveable entity electrode, and the base further comprising:

signal supply means arranged to supply a time-varying electrical signal to the first base electrode; and signal detection means arranged to detect an electrical signal from the second base electrode.

Advantageously, the coupling between the base and the moveable entity is purely capacitive; the coupling is non-inductive. Detection of the moveable entity being in the first position is achieved without requiring any inductor in the moveable entity.

It will be appreciated that the base referred to above may also be described as a first entity. In certain embodiments, the base itself may be a moveable, portable, or otherwise mobile entity. In alternative embodiments, the base may be substantially fixed in a particular location.

In certain embodiments, the moveable entity electrodes and first resistor may be incorporated in a body or housing of the moveable entity, for example, in alternative embodiments, the moveable entity electrodes and first resistor may be incorporated in a tag attached to the remainder of the moveable entity.

Advantageously, as the moveable entity only requires electrical components consisting of the first and second moveable entity electrodes and first resistor to be detected, and optionally identified, by the base, it can be produced at lower cost, and more simply than prior art moveable entities incorporating RF ID prior art moveable entities incorporating RF ID tags.

It will be appreciated that, when the moveable entity is arranged in the first position, there is capacitive coupling between the base and the moveable entity, resulting in an electrical signal being developed at the second base electrode which is then detected by the detection means.

In certain embodiments, the signal detection means can detect, from the electrical signal from the second base electrode, whether the first moveable entity is in said first position.

In certain embodiments said time-varying electrical signal is a square wave voltage signal.

Certain alternative embodiments may employ a time-varying electrical signal having a different form, such as a sinusoidal signal. However, use of a square wave signal comprising a plurality of rapid transitions provides the advantage that, if the values of R, C and T are arranged appropriately, the signal developed at the second base electrode may comprise a plurality of peaks, having at least one feature indicative of the resistance of the first resistor, so enabling the detection means to determine (i.e. identify) the resistance of the first resistor, or at least be able to distinguish it from at least one other resistance value that may be incorporated in another moveable entity that is also arrangeable in the first position.

It will be appreciated that the term "square wave" is being used in a broad sense to encompass any cyclical signal comprising relatively rapid transitions between a low state and a high state, and does not require the durations of the high state and low state cautions of the cycle necessarily to be of equal length.

In certain embodiments, the base comprises a ground rail and the signal detection means comprises a base resistor arranged to connect the second base electrode to the ground rail.

In certain embodiments, the square wave voltage signal has a time period T, the first resistor has a resistance R1, the base resistor has a resistance Rb, the first capacitor has a capacitance C1, and the second capacitor has a capacitance C2, and RC<T, where R=R1+Rb, and (1/C)=(1/C1)+(1/C2).

Arranging RC to be less than T results in the signal of the second base capacitor having a form comprising a plurality of peaks. Advantageously, in certain embodiments RC is arranged to be substantially smaller than T, enhancing the peaked form of the output signal. For example, RC may be less than 0.25 T, 0.2 T, 0.1 T, or even smaller.

In certain embodiments RC<0.1 T

In certain embodiments R, C, and T are arranged such that the electrical signal from the second base electrode is a time-varying voltage comprising a plurality of peaks.

In certain embodiments said peaks have a height indicative of R1.

In certain embodiments, the signal detection means further comprises:
- a diode having a first terminal and a second terminal, the first terminal being connected to the second base electrode; and
- a further resistor and a further capacitor connected in parallel with one another between the diode second terminal and the ground rail.

In certain embodiments, a voltage at the diode second terminal is substantially a DC voltage having a magnitude indicative of a height of said peaks.

In certain embodiments, the signal detection means comprises comparator means arranged to compare said DC voltage, or a voltage derived from said DC voltage, with at least one reference voltage.

Such an arrangement provides the advantage that a relatively simple, and low cost detection circuit may be arranged to distinguish the moveable entity from another moveable entity, having a different first resistor with a different resistance, which may also be placed in the first position.

In certain embodiments, the signal detection means is adapted to determine the resistance of the first resistor from the electrical signal from the second base electrode.

In certain embodiments, each of the first and second base electrodes and each of the first and second moveable entity electrodes comprises a respective flat plate.

In certain embodiments, the first base electrode comprises a first rectangular plate, and the second base electrode comprises a second rectangular plate arranged parallel to the first rectangular plate.

In certain embodiments, the first moveable entity electrode comprises a third rectangular plate, and the second moveable entity electrode comprises a fourth rectangular plate arranged parallel to the third rectangular plate.

In certain embodiments, the first base electrode comprises a first sectorial plate and the second base electrode comprises a second sectorial plate.

In certain embodiments, the first and second sectorial plates are arranged as adjacent sectors within a circular boundary.

In certain embodiments, the first and second sectorial plates are arranged as diagonally opposite sectors within a circular boundary.

In certain embodiments, the first moveable entity electrode comprises a third sectorial plate and the second moveable entity electrode comprises a fourth sectorial plate.

In certain embodiments, the third and fourth sectorial plates are arranged either as adjacent sectors or diagonally opposite sectors within a circular boundary.

It will be appreciated that the use of sectorial plates in the base and/or moveable entity in certain embodiments can enable the system to distinguish between a plurality of different rotational arrangements of the moveable entity with respect to the base. In other words, the base may be able not just to detect the identity of the moveable entity, but also which, of a plurality of rotational positions of the moveable entity with respect to the base, the moveable entity is arranged in.

In certain embodiments, the first base electrode comprises a first circular plate, the second base electrode comprises a first annular plate surrounding the first circular plate, the first moveable entity electrode comprises a second circular plate, and the second moveable entity electrode comprises a second annular plate surrounding the second circular plate.

Such an arrangement provides the advantage that the detection system may be insensitive to the particular rotational arrangement of the moveable entity with respect to the base unit at the first position. In other words, if the circular plates are aligned with respect to each other, and so are the respective annular plates, then the same capacitive coupling is achieved between the base and the moveable entity, irrespective of the particular rotational orientation of the moveable entity about an axis particular to the planes of the circular plates and through their centres.

It will be appreciated, however, that in alternative embodiments different arrangements of plates may be used such that the capacitive coupling between the base and moveable entity is dependent upon the moveable entity being in a correct rotational position with respect to the base.

In certain embodiments, the first base and moveable entity electrodes have substantially the same size and shape as one another.

In certain embodiments, the second base and moveable entity electrodes have substantially the same size and shape as one another.

In certain embodiments, the first moveable entity further comprises a third moveable entity electrode and a second resistor connecting the first moveable entity electrode to the third moveable entity electrode, the first and second resistors have different resistances, and the moveable entity electrodes are arranged such that the moveable entity is positionable in a second position with respect to the base in which the first base electrode and the first moveable entity electrode align to form a first capacitor and the second base electrode and third moveable entity electrode align to form a second capacitor.

In certain embodiments, the signal detection means is adapted to determine which of the first and second positions the moveable entity is positioned in with respect to the base from the electrical signal from the second base electrode.

In certain embodiments, the first base electrode comprises a first circular plate, the second base electrode comprises a second plate separated in a radial direction from a centre of the first circular plate.

In certain embodiments, the first moveable entity electrode comprises a second circular plate, the second moveable entity electrode comprises a plate separated in a first radial direction from a centre of the second circular plate, and the third moveable entity electrode comprises a plate separated in a second radial direction from the centre of the second circular plate.

In certain embodiments, the system comprises a plurality of said moveable entities, each moveable entity being moveable with respect to the base and positionable in at least said first position with respect to the base, each moveable entity comprising a respective first moveable entity electrode and a respective second moveable entity electrode, said electrodes being arranged such that when any one of said moveable entities is in said first position the first base electrode and the respective first moveable entity electrode align to form a respective first capacitor and the second base electrode and the respective second moveable entity electrode align to form a respective second capacitor, each moveable entity further comprising a respective first resistor connecting the respective first moveable entity electrode to the respective second moveable entity electrode.

In certain embodiments, the resistances of the respective first resistors are different from one another.

In certain embodiments, the signal detection means is adapted to determine (identify), when one of the plurality moveable entities is arranged in said first position, which one of said entities is arranged in said first position from the electrical signal from the second base electrode.

It will be appreciated that certain systems embodying the invention can therefore be described as capacitive coupling identification systems. Without requiring the moveable entities to be provided with inductors, the systems embodying the invention are able to provide a simpler, and lower cost tagging system, where the different moveable entities can be identified from their characteristic resistances, via capacitive coupling with the base.

In certain embodiments, the first and second base electrodes form a first pair of electrodes, and the base comprises a plurality of said pairs of electrodes, each pair comprising a respective first base electrode and a respective second base electrode, the first moveable entity being moveable with respect to the base and positionable in at least a plurality of first positions with respect to the base, each first position corresponding to alignment between the moveable entity electrodes and the first and second electrodes of a respective pair of first and second base electrodes,
the pairs of electrodes and the moveable entity electrodes being arranged such that when the moveable entity is in any one of said first positions the respective first base electrode of the respective pair and the first moveable entity electrode align to form a respective first capacitor and the respective second base electrode of the respective pair and second moveable entity electrode align to form a respective second capacitor,
and wherein the signal supply means is arranged to supply said time-varying electrical signal to each first base electrode, and the signal detection means is arranged to detect an electrical signal from each second base electrode.

Such systems may also comprise a plurality of moveable entities, each with a respective first resistor having a characteristic value as described above. Thus, the system can provide the advantage that the base is able to detect not just whether a moveable entity has been placed at one of the first positions, but also the identity of the moveable entity at that position. There are a wide variety of applications for such systems.

In certain embodiments, the signal supply means comprises multiplexing means operable to selectively supply said time-varying electrical signal to the first base electrodes.

The signal supply means may be arranged to operate the multiplexing means so that the time-varying electrical signal is supplied to just one of the first base electrodes at a particular time. Alternatively, the signal supply means may comprise the multiplexing means so as to supply the time-varying electrical signal to a selected sub-set of the plurality of first base electrodes at the same time. In alternative embodiments, however, the signal supply means may comprise no multiplexing means, and the signal supply means may be arranged to supply the time-varying electrical signal to all of the first base electrodes at the same time.

In certain embodiments, the signal detection means comprises multiplexing means operable to permit selected detection of an electrical signal from any one of said second base electrodes.

The signal detection means may be arranged to operate the multiplexing means such that the electrical signal from just one of the second base electrodes is processed or monitored at a particular time. For example, the signal detection means may be arranged to operate the multiplexing means so as to provide sequential monitoring of the electrical signal from the plurality of second base electrodes. For example, the plurality of second base electrodes may be sequentially poled so as to determine whether a moveable entity is located in the relevant position, and also to determine the identity of any such moveable entity at that position.

Another aspect of the invention provides a system comprising a base (or other first entity) and at least a first moveable entity, the first moveable entity being moveable with respect to the base and positionable in at least a first position with respect to the base,
    the base comprising at least a first base electrode, and the moveable entity comprising at least a first moveable entity electrode, and
    said electrodes being arranged such that when the moveable entity is in said first position the first base electrode and the first moveable entity electrode are coupled (e.g. capacitively) to form a first capacitor,
    the base further comprising signal supply means, arranged to supply a first time-varying electrical signal to the first base electrode, and
    the first moveable entity further comprising circuitry connected to the first moveable entity electrode.

It will be appreciated that features of the previously-described aspects and embodiments may be incorporated in embodiments of this further aspect, with corresponding advantages.

In certain embodiments said base is arranged to power said circuitry via said time-varying electrical signal and the coupling between the first base electrode and the first moveable entity electrode when the first moveable entity is in the first position.

In certain embodiments said time-varying electrical signal carries data and said circuitry is arranged to detect said data when the first moveable entity is in said first position.

In certain embodiments the base further comprises signal detection means arranged to detect an electrical signal from the first base electrode.

In certain embodiments the signal detection means is adapted to determine whether the first moveable entity is in said first position from the electrical signal from the first base electrode.

In certain embodiments the signal detection means is adapted to determine an identity of the first moveable entity when the first moveable entity is in said first position from the electrical signal from the first base electrode.

In certain embodiments said circuitry is arranged to provide a second time-varying electrical signal to the first moveable entity electrode, the second time-varying electrical signal carrying second data, and the signal detection means is adapted to detect said second data when the first moveable entity is in said first position (i.e. via the capacitive coupling between the electrodes).

In certain embodiments said circuitry comprises:
  a first node, connected to the first moveable entity electrode, a second node, and a third node;
  a first diode connected between the first node and the second node to allow current flow from the first node to the second node and block current flow from the second node to the first node; and
  a second diode connected between the third node and the first node to allow current flow from the third node to the first node and block current flow from the first node to the third node.

In certain embodiments said circuitry further comprises a second capacitor connected between the second node and the third node. Thus, in certain embodiments a voltage is developed across the second capacitor (i.e. between the second and third nodes) in response to the first time-varying electrical signal being applied to the first base electrode when the first moveable entity is in said first position.

In certain embodiments said circuitry further comprises a resistor connected between the second node and the third node. Thus, in certain embodiments an electrical current is driven through said resistor (i.e. between the second and third nodes) in response to the first time-varying electrical signal being applied to the first base electrode when the first moveable entity is in said first position.

In certain embodiments said circuitry further comprises data detection means connected to the second and third nodes and adapted to detect data carried by the first time-varying electrical signal from a signal developed between the second and third nodes when the first moveable entity is in said first position.

In certain embodiments said circuitry further comprises data transmission means connected to the second and third nodes and adapted to supply a second time-varying electrical signal carrying second data to the first moveable entity electrode.

In certain embodiments said circuitry further comprises power supply circuitry connected to the second and third nodes, adapted to receive power via the second and third nodes when the first moveable entity is in said first position, and adapted to power at least one of the data detection means and the data transmission means using said received power.

In certain embodiments the first moveable entity comprises a first portion, and a second portion attached to the first portion, wherein the second portion comprises the first moveable entity electrode and said circuitry.

In certain embodiments said second portion is a label attached to a surface of the first portion.

In certain embodiments said first portion comprises a container.

In certain embodiments said container is one of: a plastic container; and a metal container.

In certain embodiments said container is at least partly filled with liquid or solid contents.

In certain embodiments the coupling between the first base electrode and the first moveable entity electrode to form the first capacitor is at least partly via the first portion.

In certain embodiments the first portion comprises a container having a wall, and optionally at least partly filled with contents, and said coupling is at least partly via said wall, and optionally at least partly via said contents.

BRIEF DESCRIPTION OF THE DRAWINGS

Embodiments of the invention will now be described with reference to the accompanying drawings, of which.

DETAILED DESCRIPTION

Figure 1:
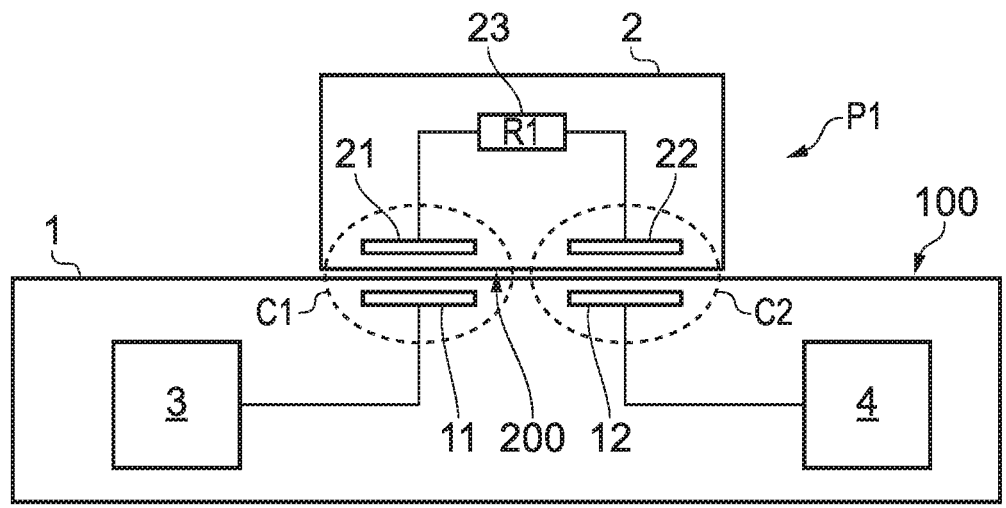
FIG. 1 is a schematic representation of a first system embodying the invention.

Referring now to FIG. 1, this is a highly schematic representation of a capacitive detection and identification system embodying the invention. The system comprises a first entity 1, which in this example is a base. The system also includes a moveable entity 2 which is moveable with respect to the base and positionable in a first position P1 with respect to the base. In this first example, in the first position P1 a flat lower surface 200 of the moveable entity 2 is generally resting on a flat upper surface 100 of the base, but in alternative embodiments the details of the engagement between the moveable entity and the base entity may be different. For example, the base entity may have a curved or contoured surface against which the moveable entity rests when in the first position. Also, in certain embodiments the surface of the base against which the moveable entity is located when in the first position is not necessarily horizontal. It could, for example, be a vertical surface, and the moveable entity could comprise means for holding it in that first position. These means could, for example, include one or more magnets, or other such means for temporarily holding the moveable entity in the first position in a releasable manner. Also, in alternative embodiments the moveable entity could simply be placed next to a non-horizontal surface of the base when in the first position, for example with a side surface of the moveable entity being adjacent to the electrodes in the base, the moveable entity being supported in some manner.

Returning to the present embodiment, the base comprises a first pair of electrodes, consisting of a first electrode 11 (which will be described as a first base electrode) and a second electrode 12 (which will be described as a second base electrode). The moveable entity 2 comprises a corresponding pair of electrodes which consist of a first electrode 21 (which will be described as a first moveable entity electrode) and a second electrode 22 (which will be described as a second moveable entity electrode). The four electrodes in the figure are arranged such that when the entity 2 is in the first position P1 the first base electrode 11 and the first moveable entity electrode 21 align to form a first capacitor C1 and the second base electrode 12 and second moveable entity electrode 22 align to form a second capacitor C2. The entity 2 further comprises a first resistor 23 connecting electrode 21 to electrode 22. The base further comprises signal supply means 3 arranged to supply a time-varying electrical signal to the first base electrode 11. The base also comprises signal detection means 4 arranged to detect an electrical signal from the second base electrode 12.

When the entity 2 is located in position P1 it is capacitively coupled to the base, and the application of the time varying signal to base electrode 11 results in the generation of an electrical signal at the second base electrode 12, which is detected by the detection means 4. When the entity 2 is moved away from position P1, the capacitive coupling is broken, and no signal is detected at the second base electrode 12. Thus, the system provides a simple and inexpensive means of detecting when the entity 2 is in the first position P1.

In certain embodiments, the signal detection means 4 is adapted to determine the resistance of the first resistance 23 from the signal at the second base electrode 12, as will be appreciated from the following description. The system may thus be able to determine whether the entity is in the first position, and also determine the identity of the entity.

Figure 2:
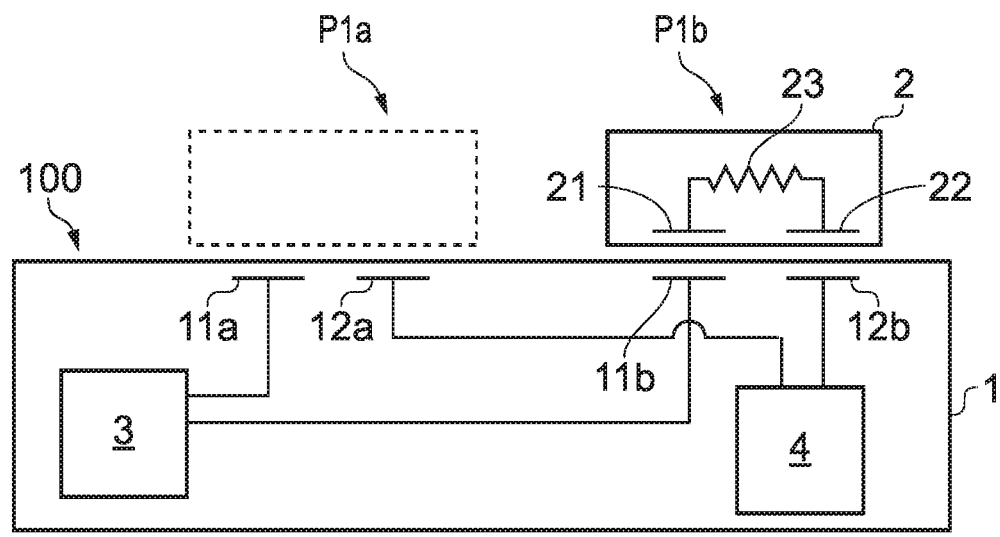
FIG. 2 is a schematic representation of another system embodying the invention.

Referring now to FIG. 2, this shows another system embodying the invention in which the base unit 1 comprises two pairs of base electrodes, each pair associated with a respective first position P1A, P1B in which a moveable entity 2 may be located to provide capacitive coupling between the base and entity. The first pair of base electrodes comprises electrodes 11A and 12A, and the second pair of base electrodes comprises electrodes 11B and 12B. The moveable entity 2 is shown in a position P1B in which its electrodes 21 and 22 form respective first and second capacitors with base electrodes 11B and 12B. In this position, entity 2 is not capacitively coupled to the first pair of base electrodes 11A, 12A. The signal supply means is arranged to supply a time varying signal to both the first base electrodes 11A, 11B and the signal detection means is arranged to detect electrical signals from each of the second base electrodes 12A, 12B. The signal detection means 4 is adapted to determine, from the signals developed at the second base electrodes, when moveable entity is located in one of the positions P1A, and P1B, and the signal detection means can further distinguish from the detected signals which, of those two positions, the entity 2 is arranged in.

Figure 3:
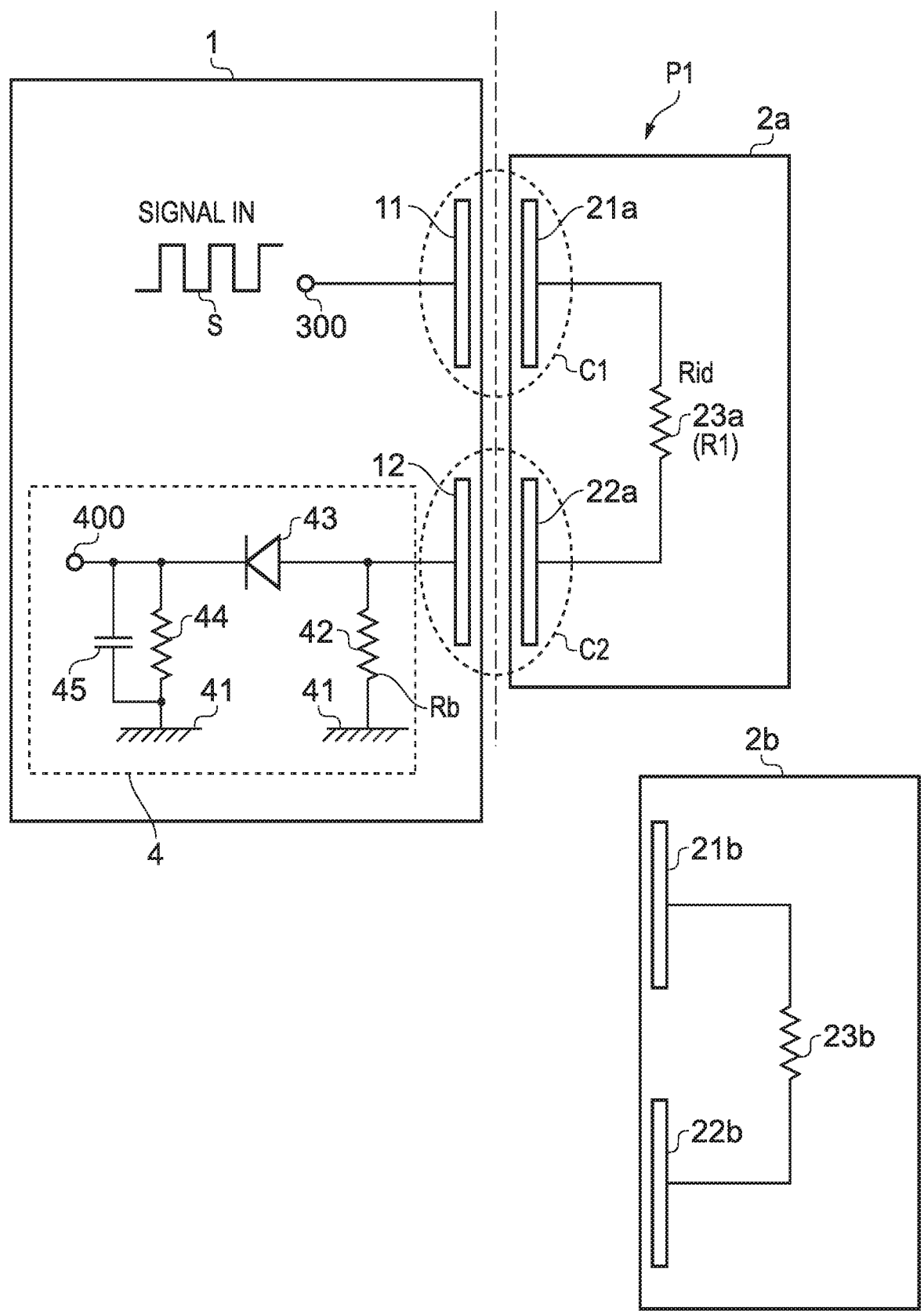
FIG. 3 is a schematic representation of another system embodying the invention.

Referring now to FIG. 3, this shows another system embodying the invention and comprising a base 1 and two moveable entities 2A, 2B, which may also be described as mobile devices. Each mobile device comprises a respective pair of electrodes 21A, 22A and 21B, 22B, and a respective resistor 23A, 23B. The resistors 23A and 23B have different resistances from one another (in other words the mobile devices comprise characteristic or identifying resistors connecting their capacitor plates) and this enables the base to determine which of the two mobile devices is in the first position P1 when either one of the devices is located in this manner. In this embodiment, the signal supply means is arranged to supply a generally square wave voltage signal S to the first base electrode 11 via an input terminal 300. When one of the mobile devices is located in the first position P1 its electrodes are capacitively coupled to the base electrodes 11, 12 and this results in the generation of a voltage on the second base electrode 12. In this embodiment, the signal detection means further comprises a second resistor 42, which may also be described as a base resistor having resistance Rb, connecting the second base electrode 12 to a ground rail 41 of the base. As the input voltage signal S is applied to the terminal 300, the first and second capacitors C1 and C2 alternately charge and then discharge, via series resistors 23A and 42. The time constant determining this charging and discharging is given by RC, where R=R1+Rb (where R1 is the resistance of the first resistor 23A) and C is the total capacitance of the series arrangement of first and second capacitors, where $(1/C)=(1/C1)+(1/C2)$. If T is the period of the square wave signal S, then if RC is substantially less than T, the voltage developed on the second capacitor plate 12 comprises a series of pulses, each having a magnitude dependent upon R1. The rapidity with which each of these pulses decays to a base line is determined by RC.

In this embodiment, the signal detection means 4 further comprises a diode 43 having a first terminal connected to the second base electrode 12 (in the figure this first terminal of the diode is shown connected to a node between the second base electrode 12 and the resistor 42) and the diode has a second terminal connected to a nominal output signal terminal 400. The signal detection means 4 further comprises a further resistor 44 and a further capacitor 45 connected in parallel with one another between the diode second terminal and the ground rail 41. The incorporation of the diode 43 and further resistor 44 and capacitor 45 results in the output signal at terminal 400 being substantially a DC signal having a magnitude proportional to the height of the voltage pulses developed on the second base electrode 12. In certain embodiments the signal detection means 4 is able to determine from the signal at terminal 400 which of the two moveable devices 2A, 2B is arranged in the first position P1, as the magnitude of the signal at terminal 400 is dependent upon the magnitude of the resistance R1 of the moveable entity resistor 23A or 23B.

It will be appreciated that the system shown in FIG. 3 comprises a base and multiple mobile devices. The base system supplies an input square signal with a predefined amplitude and frequency to the first base electrode 11. The base system provides an analogue output signal (at terminal 400) allowing the base to identify (i.e. distinguish between) each mobile device. The base system includes two half capacitor armatures, and each mobile device includes two half capacitor armatures, and one resistor of a predefined value (a characteristic value).

Thus, in certain embodiments based on the system shown in FIG. 3, with the appropriate choice of values for C, Rb and frequency of the input signal, the DC value at the terminal 400 is proportional to the resistance of the particular mobile device 2A or 2B arranged in the first position P1. In such arrangements, one would typically work with RC<<T. The signal detection means 4 of FIG. 3 enables the system to measure the peak value of the signal developed at the second capacitor plate 12. A small variation in capacitor value (i.e. of the total capacitance C defined by the first and second capacitors C1, C2) will have very little impact on the output voltage at terminal 400. This enables the system to be robust and remain accurate, even if impurities or wear and tear appear at the armature level (e.g. degrade the services of any dielectric materials covering the electrodes, thereby slightly altering the separation of the electrodes when a moveable device is in the first position P1.

In alternative embodiments, the signal detection means may be arranged to measure average values of the output signal or average values of the signal developed directly at the second base electrode 12, in which case capacitor variation would be more noticeable. This variation in capacitor value can be deliberately used in certain alternative embodiments to detect different orientations of a mobile device with respect to the base, in which case different shaped electrodes should be used, such as those illustrated in FIGS. 11, 12, 13, and 14. With those electrodes, depending on the rotation of the moveable device with respect to the base, the capacitor electrodes or plates will overlap to varying degrees. This alters the total capacitance of the series arrangement of first and second capacitors, and this in turn is manifested at the second base electrode 12. Thus, in certain embodiments the signal detection means can determine the particular orientation of a mobile device with respect to the base, when the mobile device is generally in the first position.

Returning to embodiments in which we do not wish variations in C to influence the output value, it is necessary to work in the RC<<T mode. In such embodiments, C may practically be a few pF to a few nF. The resistance Rb then needs to be low enough to allow the energy transfer within the pulse signal, and high enough to allow the widest range of Rid values to provide the widest signal dynamic. The rectifier diode 43 may be used with a 10 MOhm load 44 and a 10 nF capacitor 45 to convert the peak value at the second base electrode 12 into a proportional DC value. One or more comparators may then be used to identify which of the mobile devices 2A, 2B is located in the first position from the signal at terminal 400. Comparators may be implemented at low cost, which in conjunction with the simple electrical elements incorporated in the mobile devices (i.e. just capacitor electrodes and a resistor) enables the entire system to be implemented at low cost.

Figure 4:
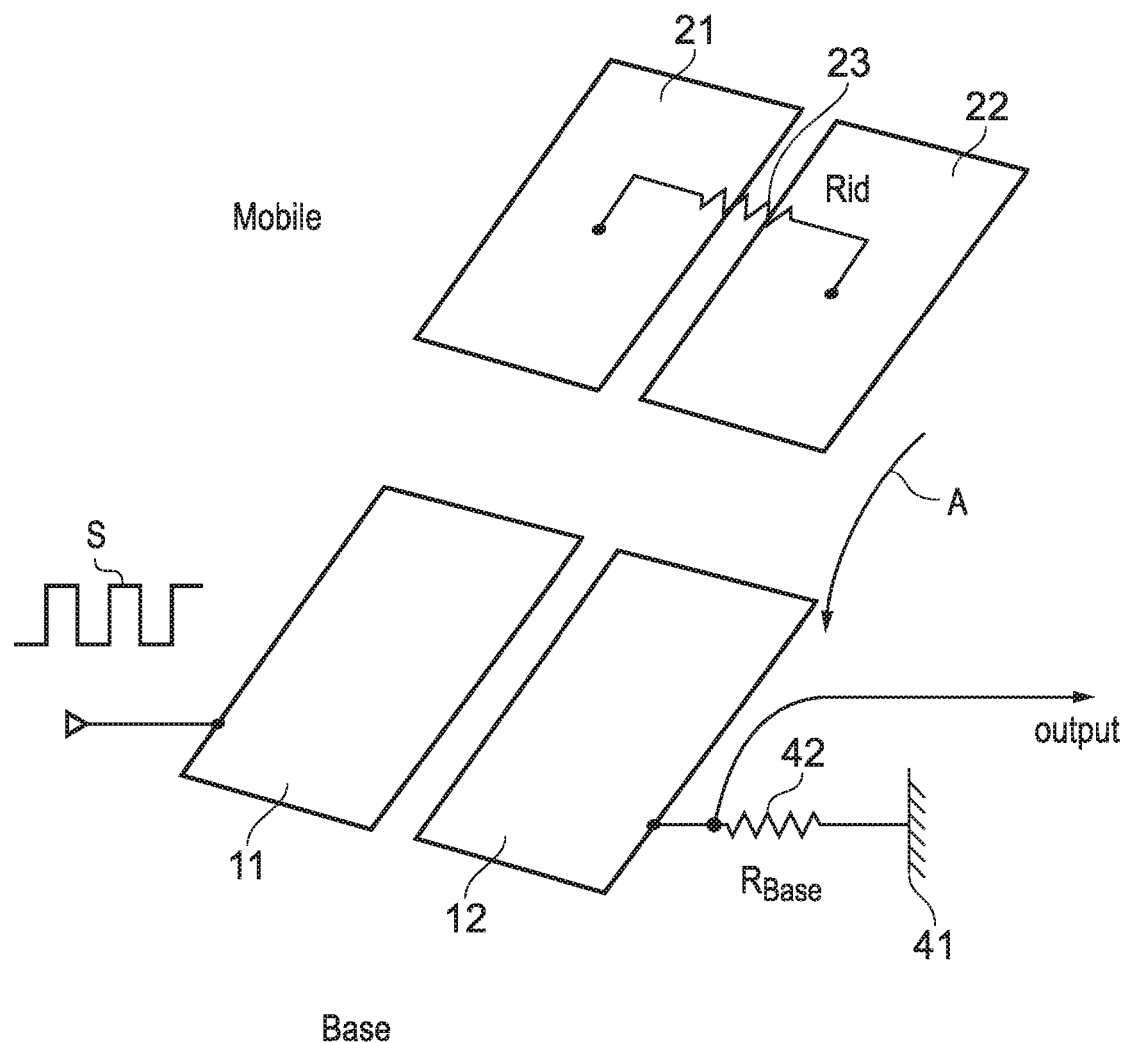
FIG. 4 illustrates some of the components of another system embodying the invention.

Referring now to FIG. 4, this shows an electrode arrangement which may be used in certain embodiments of the invention. Here, the first and second base electrodes 11, 12 are each in the form of rectangular plates, and those rectangular plates are arranged parallel to one another. The corresponding electrodes of the mobile device 21, 22 are also in the form of rectangular plates, arranged parallel to one another. In this example, each of the plates 11, 12, 21, 22 has substantially the same size and shape as the others, and the gaps between the electrodes 11 and 12 and the electrodes 21 and 22 are also the same. Thus, when the mobile device is brought into close proximity with the base the four electrodes are able to align closely with each other and provide a high degree of capacitive coupling between the base and mobile entity.

Figure 5:
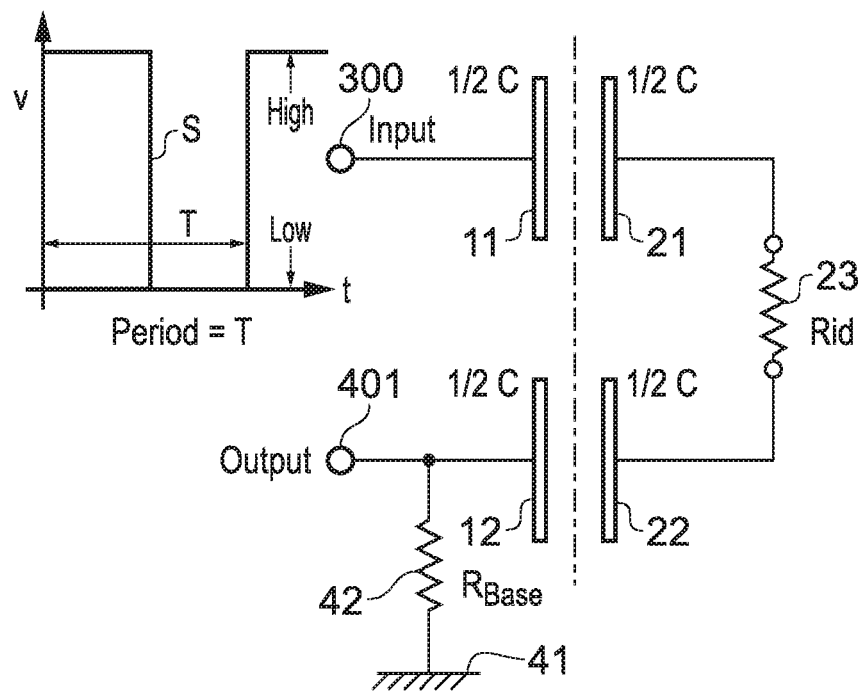
FIG. 5 illustrates the application of a square wave input voltage to part of the system embodying the invention.
Figure 6:
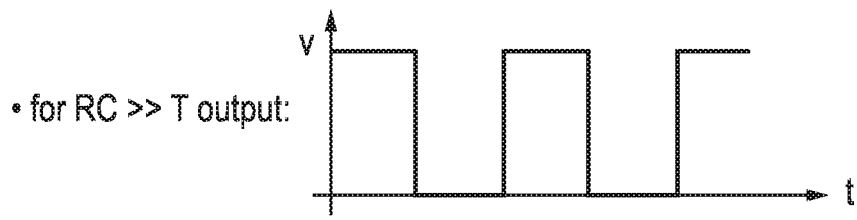
FIGS. 6, 7 and 8 show different output wave forms from the arrangement of circuit components shown in FIG. 5 for different values of RC relative to the period T of the square wave input signal.

Moving on to FIG. 5, this shows part of a system embodying the invention in which a square wave input voltage signal of period T is applied to the input terminal 300 connected to the first base electrode 11. The components of the mobile device enabling its detection by the base unit are shown in the coupled position, such that the square wave applied to terminal 300 results in generation of a detectable signal at the output terminal 401 which is connected to the second base electrode 12 and the non-grounded terminal of a base resistor 42. FIG. 6 shows the typical output wave form at terminal 401 when RC>>T.

Figure 7:
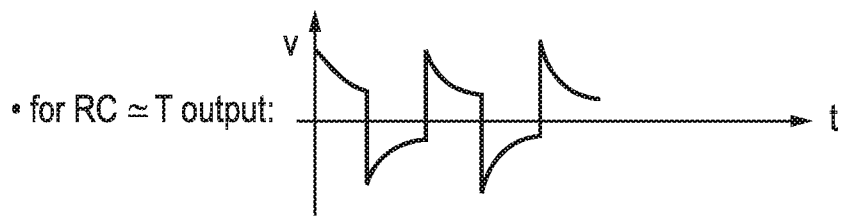

FIG. 7 shows the typical output wave form at terminal 401 when RC is approximately equal to T.

Figure 8:
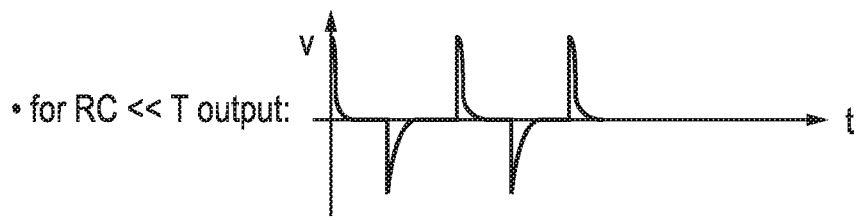

FIG. 8 shows the output wave form at terminal 401 for RC<<T.

Figure 9:
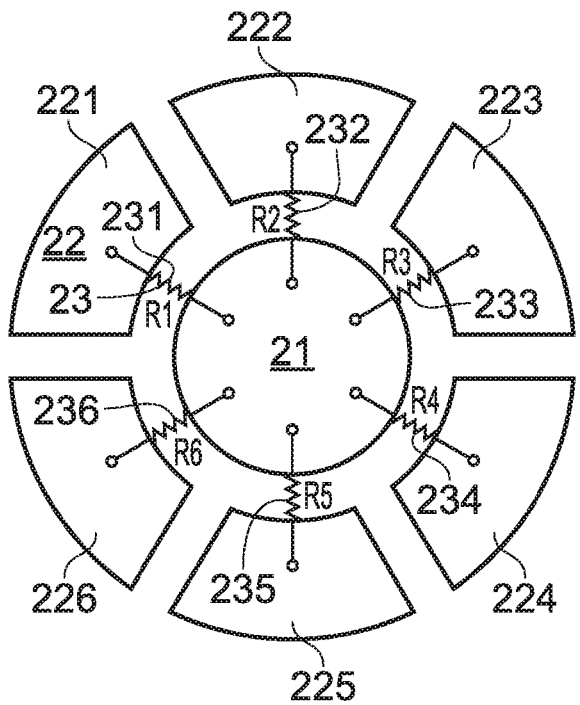
FIGS. 9 and 10 respectively show the arrangement of moveable entity electrodes and base electrodes in a system embodying the invention.
Figure 10:
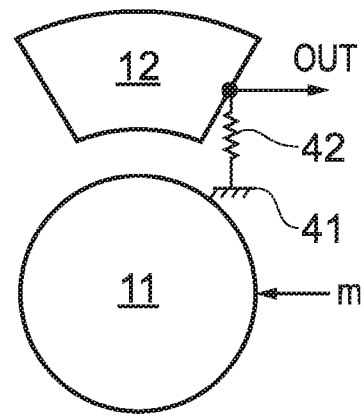

Moving on to FIGS. 9 and 10, these respectively show the mobile entity electrodes and base electrodes which may be utilised in alternative embodiments of the invention. Here, the mobile entity comprises a central, circular first electrode 21. Around that electrode are positioned a plurality of second moveable entity electrodes 221-226. Each of these second moveable entity electrodes is connected to the central electrode 21 by a respective resistor 231-236, and each of these resistors 231-236 has a resistance different from the others. The corresponding arrangement of electrodes in the base comprises a substantially circular first electrode 11 (which has substantially the same size and shape as the central electrode 21 of the moveable entity). The second base electrode 12 has the same size and shape as each of the second electrodes 221-226 of the mobile entity, and is separated from the central electrode 11 in a radial direction in the same manner as each of the second electrodes 221-226 are separated from the central electrode 21. These electrode arrangements are utilised in systems where the signal detection means is able to distinguish between a number of different resistor values connecting the moveable entity electrodes. Thus, the electrode arrangements of FIGS. 9 and 10 can be incorporated in the system which is adapted to identify and distinguish between six different rotational positions in which the moveable entity can be placed next to the base.

Figure 11:
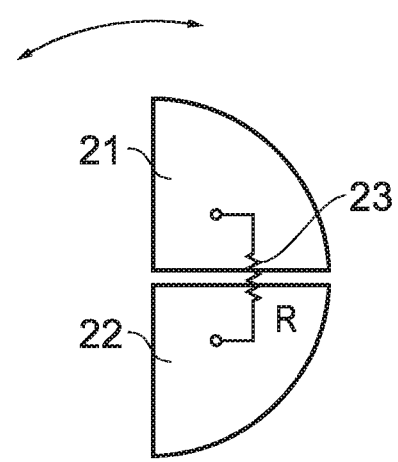
FIGS. 11 and 12 respectively show the arrangement of moveable entity electrodes and base electrodes in another system embodying the invention.
Figure 12:
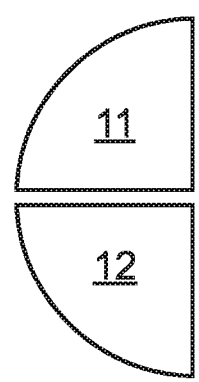

Moving on to FIGS. 11 and 12, these show alternative electrode arrangements which may be used in other embodiments of the invention. Here, the first and second base electrodes are each in the form of a sectorial plate, and those plates are arranged adjacent one another such that together they substantially comprise a semicircular sector. The first and second moveable entity electrodes 21 and 22 have the same sizes and shapes as the base electrodes. It will be appreciated that the mobile device can be positioned generally next to the base and then rotated to vary the amount of overlap between the mobile device plates and the base plates 11 and 12, thereby changing the total capacitance C of the first and second capacitors connected in series. In certain embodiments the signal protection means is arranged to detect the rotational position of the mobile device with respect to the base from the effect that this changing capacitance has on the output signal of the second capacitor plate 12.

Figure 13:
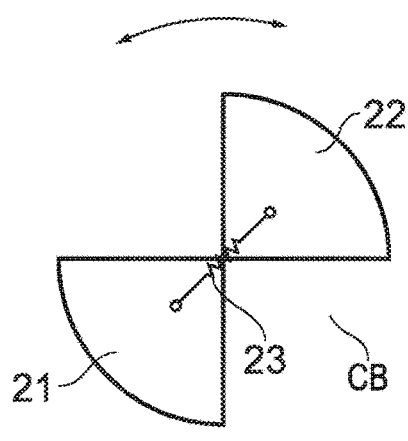
FIGS. 13 and 14 respectively show the arrangement of moveable entity electrodes and base electrodes in another embodiment of the invention.
Figure 14:
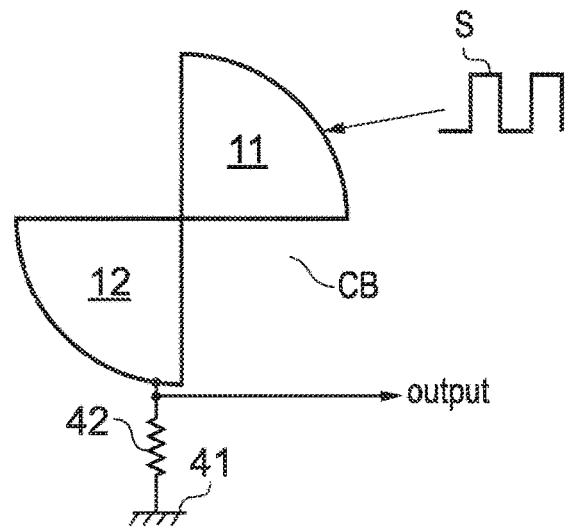

Referring now to FIGS. 13 and 14, these show electrode arrangements related to those shown in FIGS. 11 and 12. Here, the mobile device and base electrodes are again generally sectorial, but this time are arranged so that they are diagonally opposed within a nominal circular boundary CB.

Again, the output signal from the second base electrode 12 is dependent on the total capacitance C, which in turn is dependent upon the rotational position of the mobile device with respect to the base, which determines the amount of overlap between the respective plates.

Figure 15:
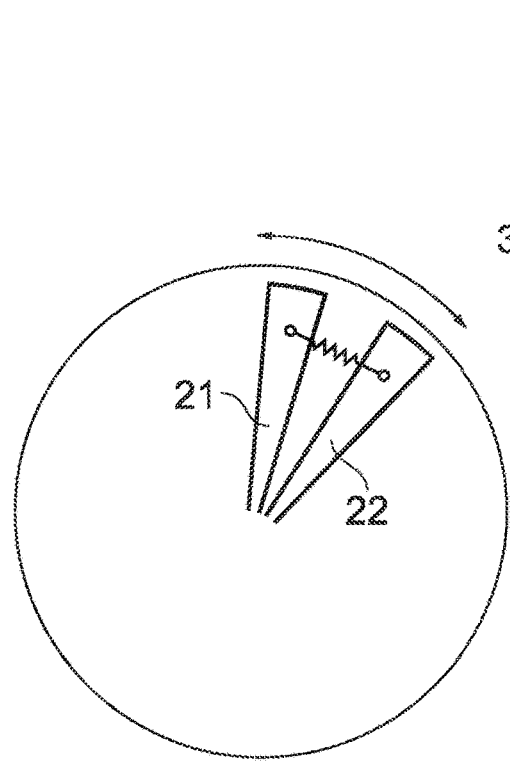
FIGS. 15 and 16 respectively show the arrangement of moveable entity electrodes and base electrodes in another embodiment of the invention.
Figure 16:
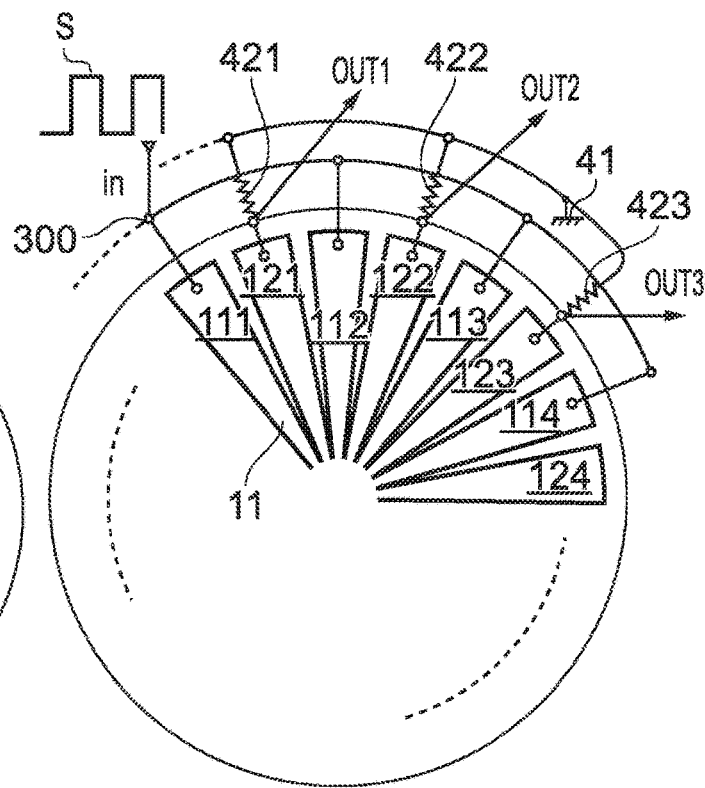

Moving on to FIGS. 15 and 16, these show alternative electrode arrangements which are used in other embodiments of the invention. Here, the mobile device comprises first and second electrodes 21, 22, which are each sectorial, but extend round only a small angle with respect to a notional centre. The base comprises a plurality of pairs of electrodes extending fully around a circle (although only a few are shown in the figure for clarity) each of these base electrodes is sectorial. A first pair of base electrodes comprises a first electrode 111 and a second electrode 121. A second pair of electrodes comprises a first electrode 112 and a second base electrode 122, and so on. The signal generating means is arranged to provide a time varying input signal to an input terminal 300 which is connected to each of the first electrodes 111, 112 etc of the plurality of pairs. Each of the second electrodes 121, 122 etc of the pairs is connected to a ground rail 41 by a respective base resistor 421, 422 etc and the signal detection means is adapted to monitor output signals from each of the second base electrodes. It will be appreciated that, depending on the particular orientation of the mobile device with respect to the base, the mobile device electrodes may be capacitively coupled with any one of a number of different base electrode pairs. From the output signals, the signal detection means is thus able to detect the particular orientation of the mobile device with respect to the base unit.

Figure 17:
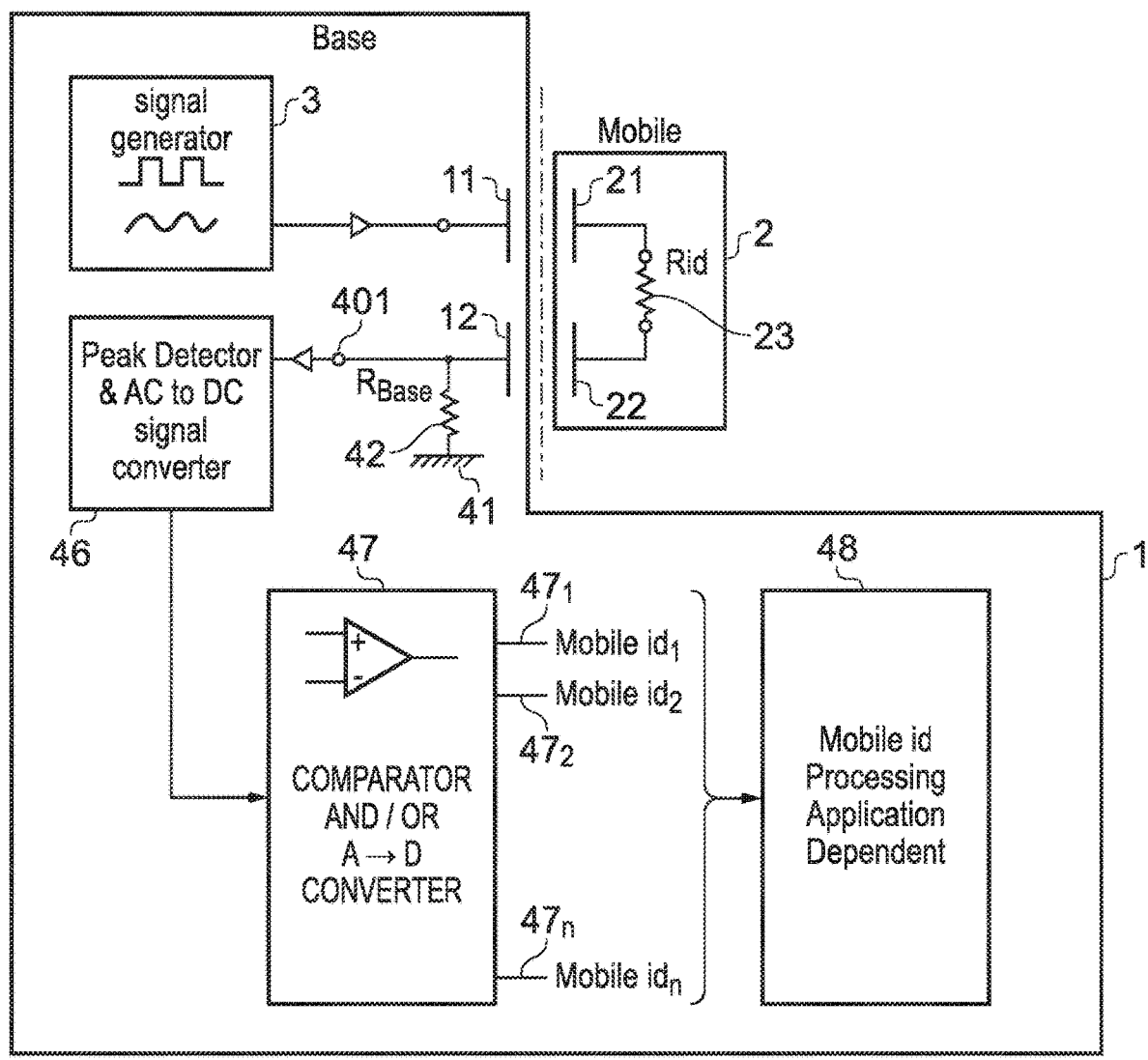
FIG. 17 is a schematic representation of another system embodying the invention.

Referring now to FIG. 17, this illustrates another system embodying the invention in which a base 1 is adapted to determine whether a mobile device 2 is located in a predefined position with respect to the base, and furthermore can determine the identity of the mobile device. The system comprises a signal generator 3 arranged to provide a time varying signal to a first capacitor electrode 11. This signal may be a square wave, a sinusoidal wave, or a wave having some other form suitable for enabling the signal detection means to determine from the signal of the second electrode 12 the presence and identity of the mobile device 2. The system comprises circuitry 46 which performs the function of peak detection and AC to DC signal conversion on the signal from node 401 which is connected to the second base electrode 12. That circuitry 46 provides a corresponding signal to circuitry 47 which includes at least one comparator and/or an analogue to digital converter. In embodiments where the circuitry 47 comprises a plurality of comparators, the circuitry 47 is adapted to provide an output signal at one of a plurality of corresponding output terminals 471, 472-47n, each of these output terminals corresponding to a particular respective mobile device identity. In other words, if the mobile device 2 positioned so as to be coupled to the base electrodes is a first mobile device, having its characteristic first value of Rid, then an output signal is generated from terminal 471. If the device is a second mobile device with a different characteristic resistance, then an output signal is generated at terminal 472 etc. In certain embodiments, the base also comprises circuitry 48 which is arranged to receive the output signals from the terminals 471-47n and perform application dependent processing, based on the detected mobile identity or identities.

Figure 18:
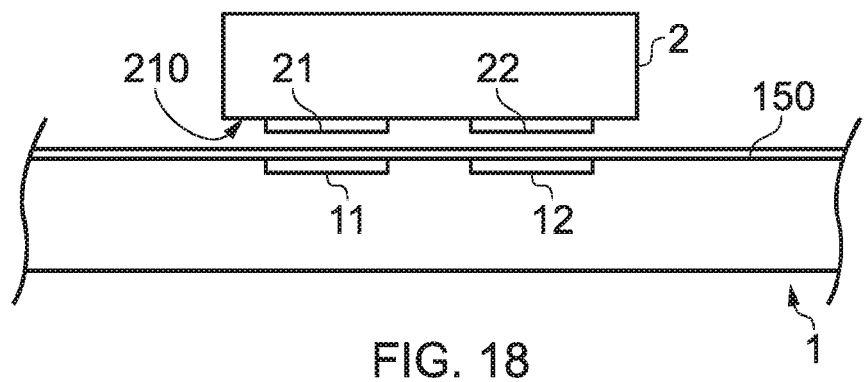
FIGS. 18-21 show the arrangement of moveable entity electrodes and base electrodes in a number of different embodiments to the invention.

Referring now to FIGS. 18-21, these show different arrangements of base and mobile device electrodes which may be incorporated in embodiments of the invention. In FIG. 18, the base 1 comprises a layer of dielectric material 150 which covers the first and second base electrodes 11, 12. The layer 150 thus ensures that no direct electrical contact can be made to the base electrodes. A variety of materials may be used for this covering 150, for example plastic, paper, or other insulating materials, which may be rigid or flexible. The mobile device 2 has its first and second electrodes 21 and 22 exposed in this example, each one being located on an external surface 210 of the device. The mobile device electrodes can thus be brought into direct contact with the insulating layer or covering 150 on the base to bring them as close as possible to the corresponding base electrodes, thereby increasing the capacitive coupling between the base and mobile device.

Figure 19:
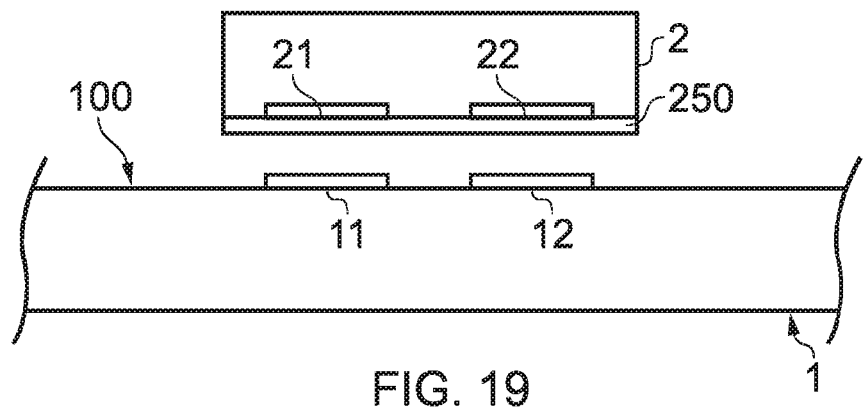

Referring to FIG. 19, in this alternative arrangement the mobile device comprises an insulating layer or covering 250, which covers the mobile device electrodes 21, 22. The base electrodes 11, 12 are now exposed, being provided on an external surface 100 of the base 1.

Figure 20:
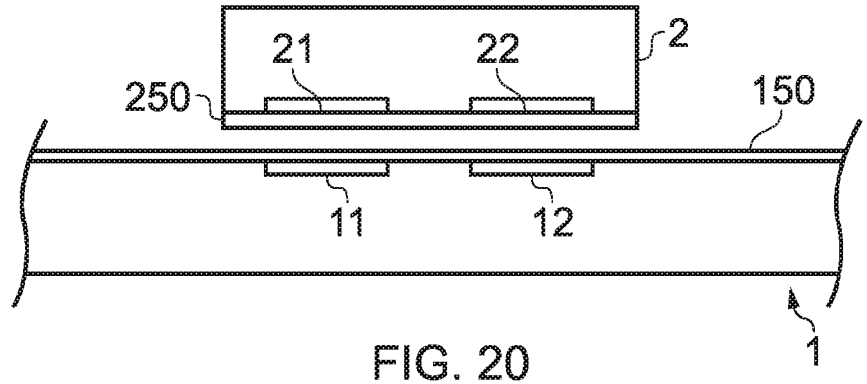

Referring now to FIG. 20, in this arrangement each of the base and mobile device comprises a respective insulating layer, covering, or coating 150, 250, covering its respective electrodes. Generally, it is desirable to make these coverings as thin as possible to increase the capacitive coupling between the base and device 2.

Figure 21:
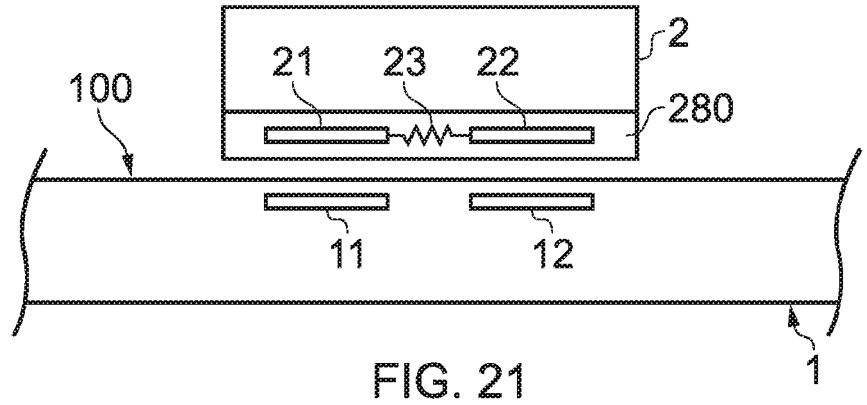

FIG. 21 shows an alternative arrangement in which the base electrodes 11 and 12 are embedded in the body of the base, slightly below an external surface 100. The moveable device electrodes 21, 22 and connecting resistor 23 are comprised in a tag or label 280 which is attached to the remaining part of the mobile device 2. Thus, an identifying tag or label 280 can conveniently be applied to a moveable device to enable detection and identification of that device relative to a base 1.

Figure 22:
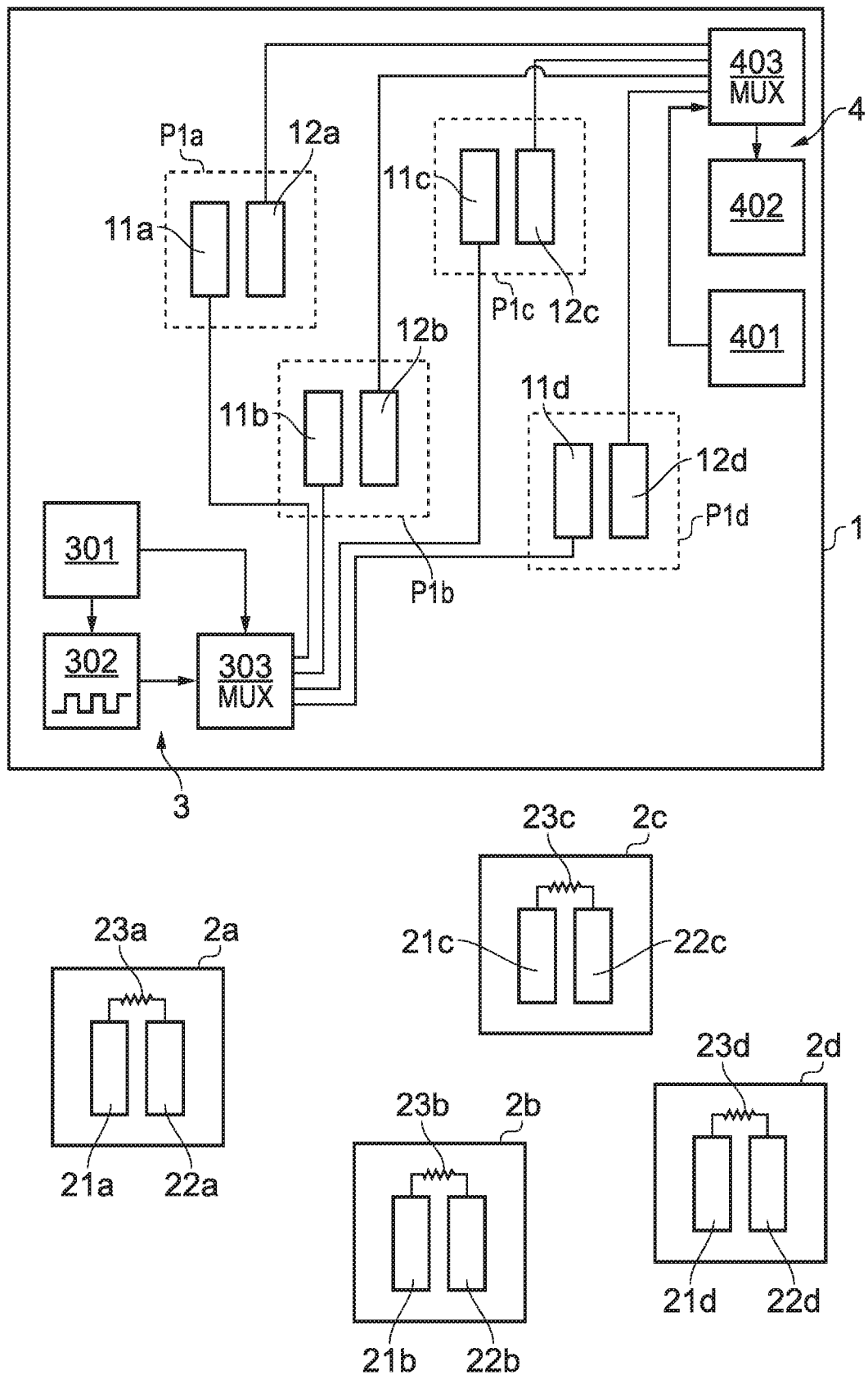
FIG. 22 is a schematic representation of another system embodying the invention.

Referring now to FIG. 22, this shows another system embodying the invention. Here the base 1 comprises a plurality of pairs of base electrodes 11A, 12A-11D, 12D each associated with a particular position P1A-P1D at which one of a plurality of mobile devices 2A-2D can be located with respect to the base. The base 1 comprises signal supply means 3 which comprises a signal generator 302, a multiplexer 303, and a controller 301. The signal generator 302 supplies a time varying signal to the multiplexer and the controller 301 controls the multiplexer 303 to apply the time varying signal to a selected one or plurality of the first base electrodes 11A/11D. The base 1 also comprises signal detection means 4 which comprises a controller 401, multiplexing means 403, and signal processing means 402. The controller 401 controls the multiplexing means 403 to selectively direct the output signal from any one of the second base electrodes 12A-12D to the signal processing means 402. Thus, the controllers 301 and 401 can operate so that each of the pairs of base electrodes is selectively energised and monitored (which may also be described as selectively poling these pairs) to check whether one of the mobile devices 2A-2D is positioned over that respective pair. Each of the mobile devices 2A-2D comprises a respective pair of first and second electrodes, and a respective resistor 23A-23D connecting those electrodes. The system is thus able to detect the positioning of any one of the mobile devices at any one of the positions P1A-D, and furthermore the base can detect which mobile device is positioned at each location.

Figure 22A:
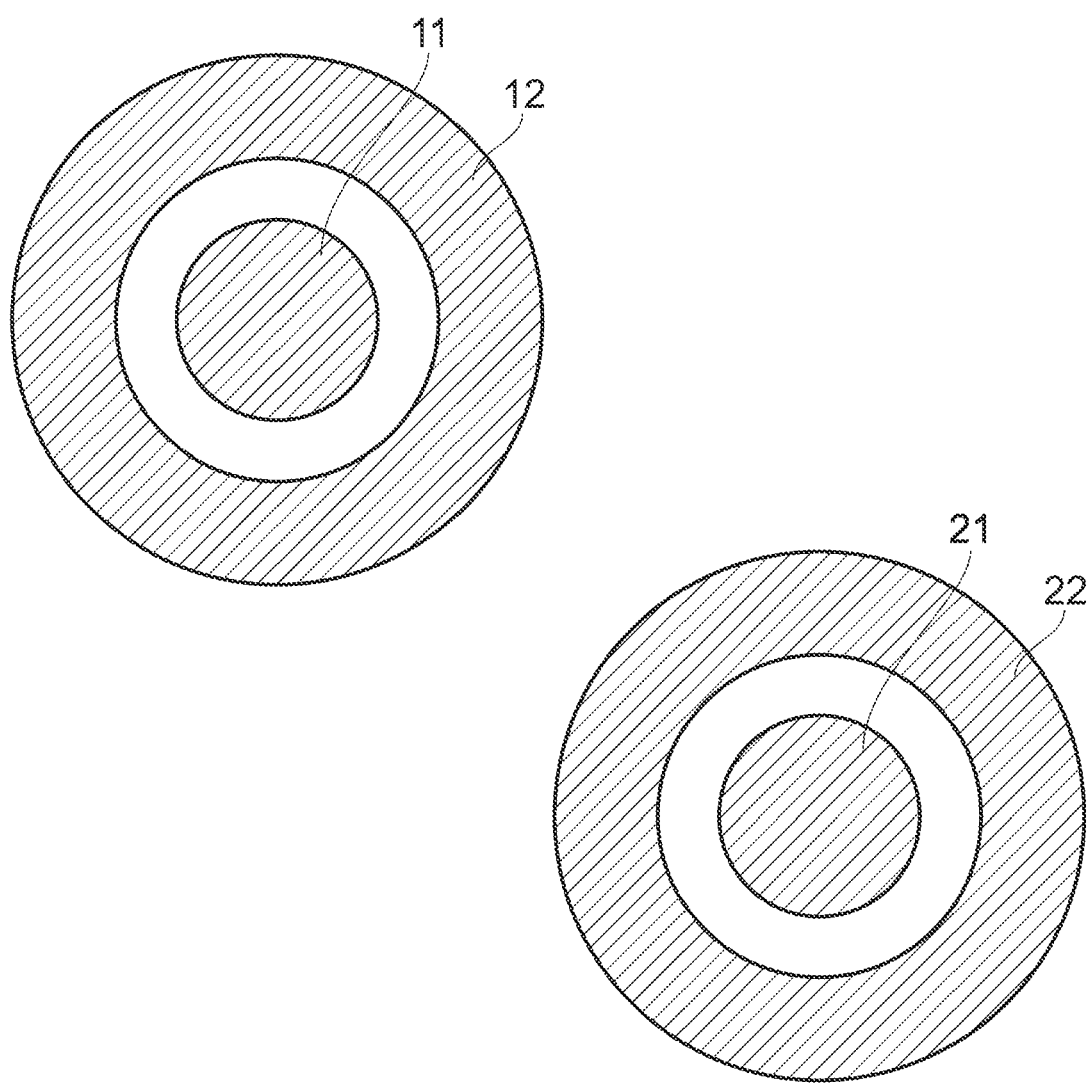
FIG. 22A is a schematic representation of an alternative electrode arrangement employed in other embodiments of the invention.

Referring now to FIG. 22A, this shows an alternative electrode arrangement used in certain embodiments of the invention. Here, the pair of base electrodes comprises a central first electrode 11, surrounded by an annular second electrode 12. The electrodes 21 and 22 of the mobile device have the same general size and shape, that is they comprise a central circular electrode 21 and an outer annular electrode 22. When the electrodes are arranged correctly next to one another, with the central electrodes aligned with one another, the capacitive coupling between the two is large, and is unaffected by the particular rotational orientation of the moveable device electrodes with respect to the base.

Referring now to FIGS. 23-30, these show further embodiments of the invention. These embodiments can be regarded as disclosing a proximity field communication technique which can provide contactless single wire energy and/or data transfer (which may be bidirectional).

Figure 23:
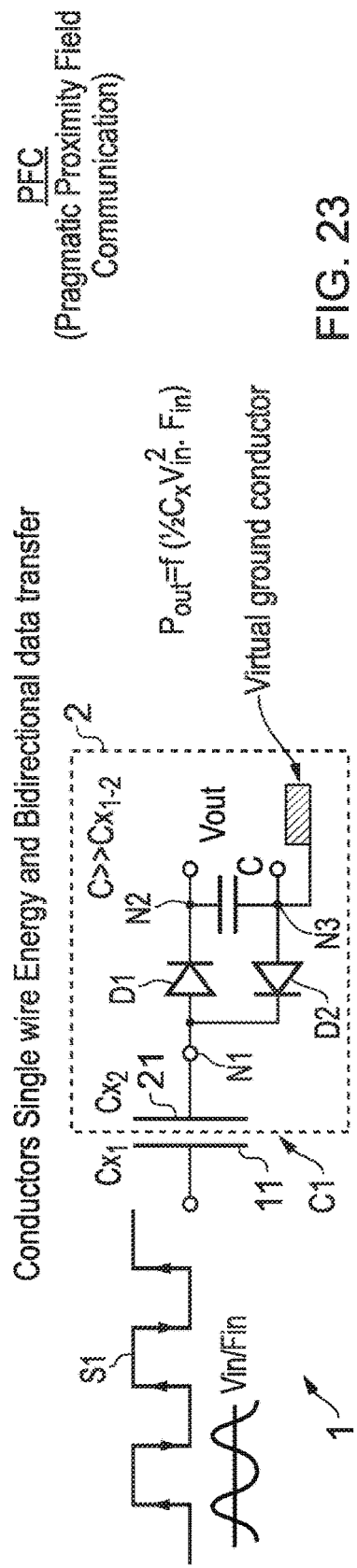
FIGS. 23-30 show further embodiments of the invention.

Referring in particular to FIG. 23, this illustrates the basic principle of these embodiments, decoupling an AC signal with two half capacitor armatures 11, 21, that when brought close enough are capacitively coupled to form a first capacitor C1. Signal variations applied to the first capacitor armature CX1 (11) are transmitted to the second half capacitor armature CX2 (21). The system generally comprises a base 1 comprising a first base electrode 11 and signal supply means arranged to supply a first time-varying electrical signal S1 to the first base electrode 11. The components of the system in the right half of the figure are the components of the first moveable entity 2 which comprises the first moveable entity electrode 21 and circuitry connected to the first moveable entity electrode 21. In this example, the circuitry comprises a first node N1 connected to the electrode 21, a second node N2, and a third node N3. The circuitry also comprises a first diode D1 connected in the forward direction between nodes N1 and N2, and a second diode D2 connected in the forward direction between nodes N3 and N1. Node N3 is connected to a virtual ground conductor. A capacitor C is connected between the nodes N2 and N3, where C is much $\geq$C1. The first time varying signal S1 supplied to the first electrode 11 is square wave, having amplitude V in and frequency F in. By means of the signal S1 and capacitive coupling between the plates 11 and 21, a power output may be extracted from the nodes N2 and N3, where that power output is a function of half C1 V in$^2 \times$F in.

In other words, when the square wave signal S1 is applied to electrode 11, the positive edge is transmitted via the top diode D1, then the negative edge will create the return with the bottom diode D2. There is no electric return, as there is only one pole, the electric return is created locally. Efficiency is improved with the number of electrons available at the virtual ground.

Figure 24:
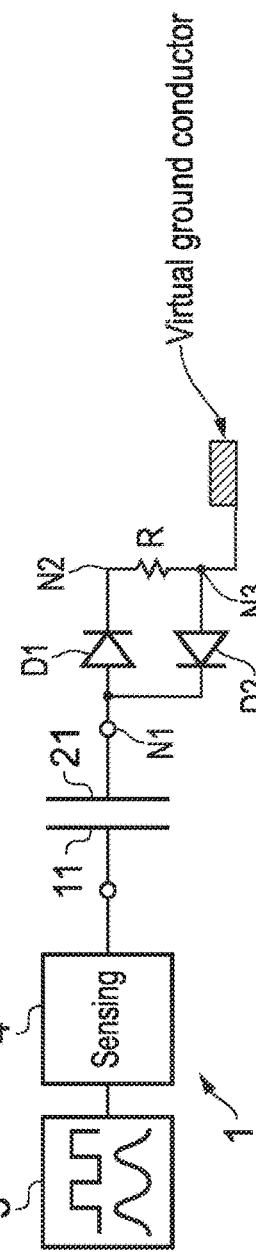

Referring now to FIG. 24, this shows another embodiment of the invention. Here, the base 1 comprises signal supply means 3 adapted to provide the first time varying signal to the electrode 11, and also comprises signal detection or sensing means 4 adapted to detect an electrical signal from the first base electrode 11. Thus, the sensing means 4 can detect when the first moveable entity 2 is in the first position, with the capacitor plates 11 and 21 coupled, by means of the signal sensed on capacitor plate 11. In this example the first moveable entity comprises a resistor R connected between the second and third nodes. The time varying signal applied to the first capacitor plate 11 results, by means of coupling with the second electrode 21, in a current being driven through the resistor R, which in turn results in a return signal being supplied to the second capacitor plate 21, which in turn provides a signal on the first capacitor plate 11, which is then sensed by the sensing means. Thus, the system can detect when the first moveable entity is in the first position. Furthermore, in certain embodiments, the system can detect, via the return signal on the first capacitor plate 11 the identity of the moveable entity arranged in the first position (different moveable entities may employ different values for the resistor R, and this in turn influences the signal picked up by the sensing means 4 in response to the initial driving of capacitor plate 11 with the first time-varying signal). Thus, a moveable entity (or mobile device) can be identified through its local load, with one pole as opposed to two poles as described previously in connection with alternative aspects and embodiments.

Figure 25:
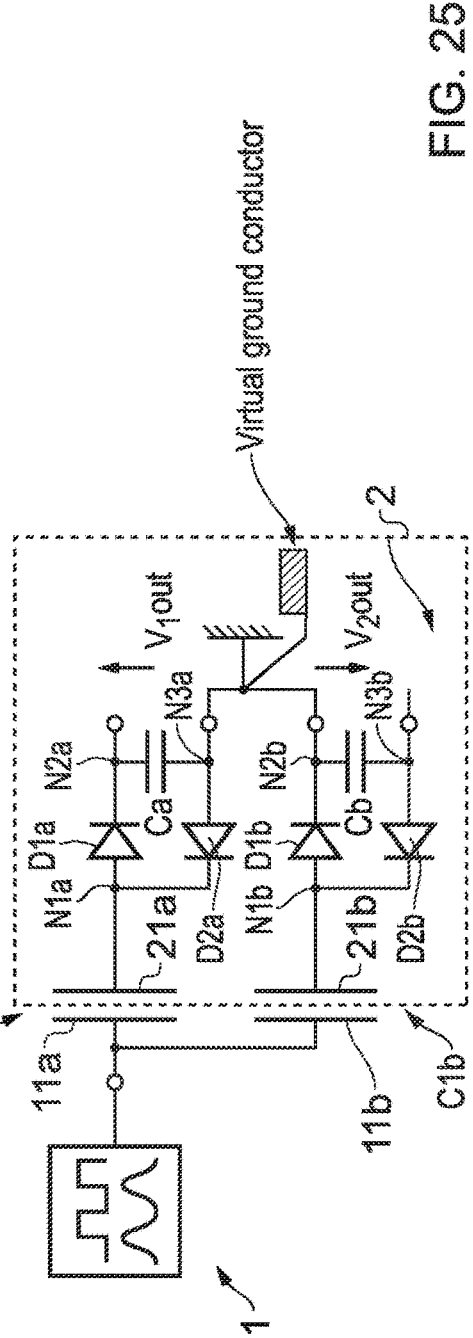

Moving on to FIG. 25, this shows how multiple voltages can easily be generated. In this configuration, the system can be used to split energy and data sent and data received, with one pole as an input but multiple half capacitors. Thus, in the system of FIG. 25, the base 1 includes a pair of first capacitor plates 11$a$ and 11 $b$, and the moveable entity 2 comprises corresponding capacitor plates 21$a$ and 21$b$ which, when the entity is in the aligned position, form capacitors C1$a$ and C1$b$ with the base. The components of the moveable entity circuitry are shown in the figure, and it will be seen that nodes N3$a$ and N2$b$ are connected to ground in this example (or at least virtual ground). Capacitive coupling in the illustrated configuration results in two output voltages being developed (between nodes N2$a$ and N3$a$, and N2$b$ and N3$b$ respectively), when the time varying signal is supplied to the first capacitor plates 11$a$ and 11$b$.

Figure 26:
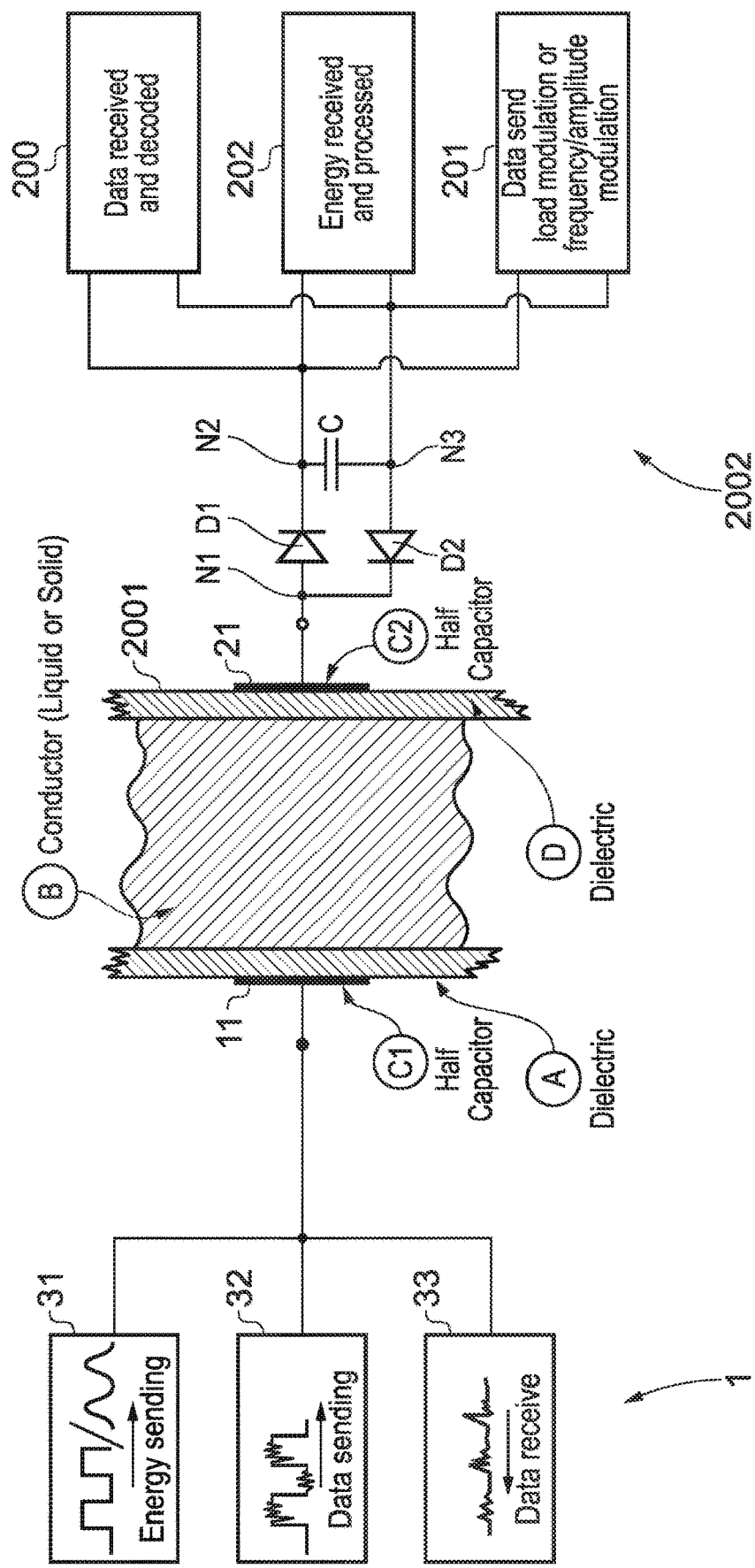

Referring now to FIG. 26, this shows a further embodiment in which the base 1 comprises energy transmission or energy sending means 31 arranged to provide the time varying signal in the form of a square wave or sign wave to capacitor plate 11. The base also includes data sending or data transmission means 32 adapted to encode the signal supplied to the first capacitor plate 11 with data, such that the first time varying signal carries data. The base 1 also comprises data receiving or data extraction or detection means 33 arranged to detect data on a signal developed on capacitor plate 11 by means of coupling with the moveable entity capacitor plate 21. In this embodiment, the moveable entity comprises a first portion 201 in a form of a plastic bottle filled with a liquid or solid, and a second portion 202 which includes the capacitor plate 21 and connected circuitry. The plastic bottle is arranged adjacent the first capacitor plate 11 and the second capacitor plate 21 is attached to a side surface of the plastic bottle, such that capacitive coupling between the plates 11 and 21 is by means of the plastic bottle and its contents. The moveable entity circuitry comprises means for receiving data and decoding data 200 which can also be described as data detection means 200. This data detection means is connected to the second and third nodes N2, N3 and is adapted to extract data that was carried by the signal supplied to the first capacitor plate 11. The circuitry further comprises data transmission means 201 (which can also be described as data sending means, or a load modulation means, or a frequency or amplitude modulator) and this data transmission means 201 is also attached to the second and third nodes. This unit 201 is operable to generate a time varying signal on the second capacitor plate 21 which carries data, and that data can then be detected by the data receiving means 33 of the base by means of the capacitive coupling between the plates 11 and 21 via the container and its contents. The circuitry also comprises power supply means 202, which can also be described as energy receiving and processing means, and this power supply 202 is adapted to receive power from the base 1 via the capacitive coupling between the plates 11 and 21 and power the data receiving and sending means 200, 201. This power supply means 202 is also connected to the second and third nodes.

It will be appreciated that the system of FIG. 26 can be operated in a number of different ways. For example, energy only can be sent from plate 11 and received at plate 21. Energy and data can be sent from plate 11 and received at plate 21. Energy and data can be sent from plate 11 and received at plate 21, as well as data can be sent from plate 21 and received at plate 11. Multiple wave forms may be used to send and/or receive energy, for example square waves, sinusoidal waves, triangular waves, etc. Multiple techniques can be used for transmitting and receiving data, in either direction, for example amplitude modulation, frequency modulation, load modulation, etc.

Figure 27:
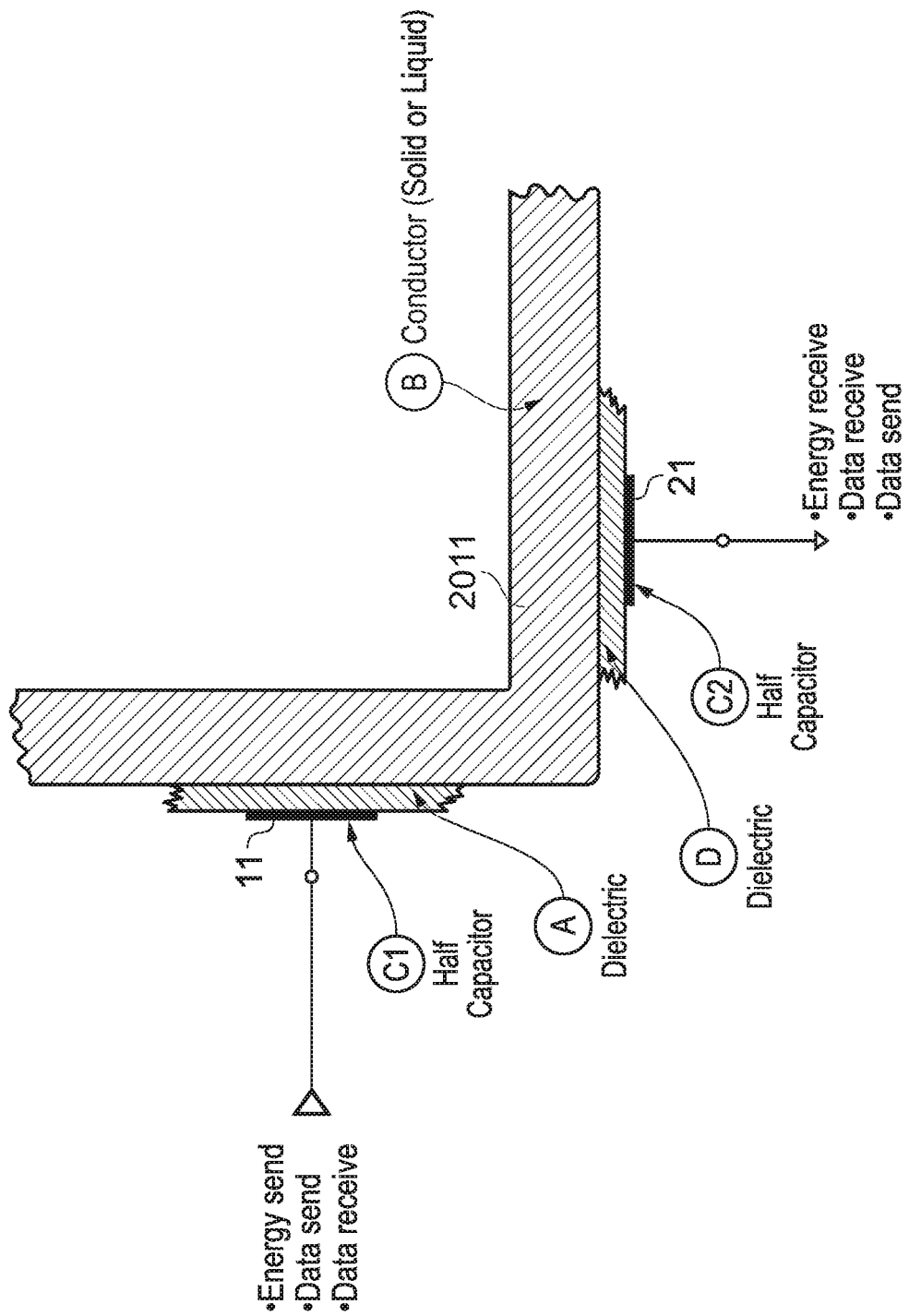

Referring now to FIG. 27, this shows part of an alternative system where the first portion of the moveable entity is a metal can or container, having a metal container wall 2011. Coupling between the capacitor plate 11 and 21 is via the container wall 2011, and the system further comprises dielectrics arranged between the capacitor plates 11 and the metal wall 2011.

Figure 28:
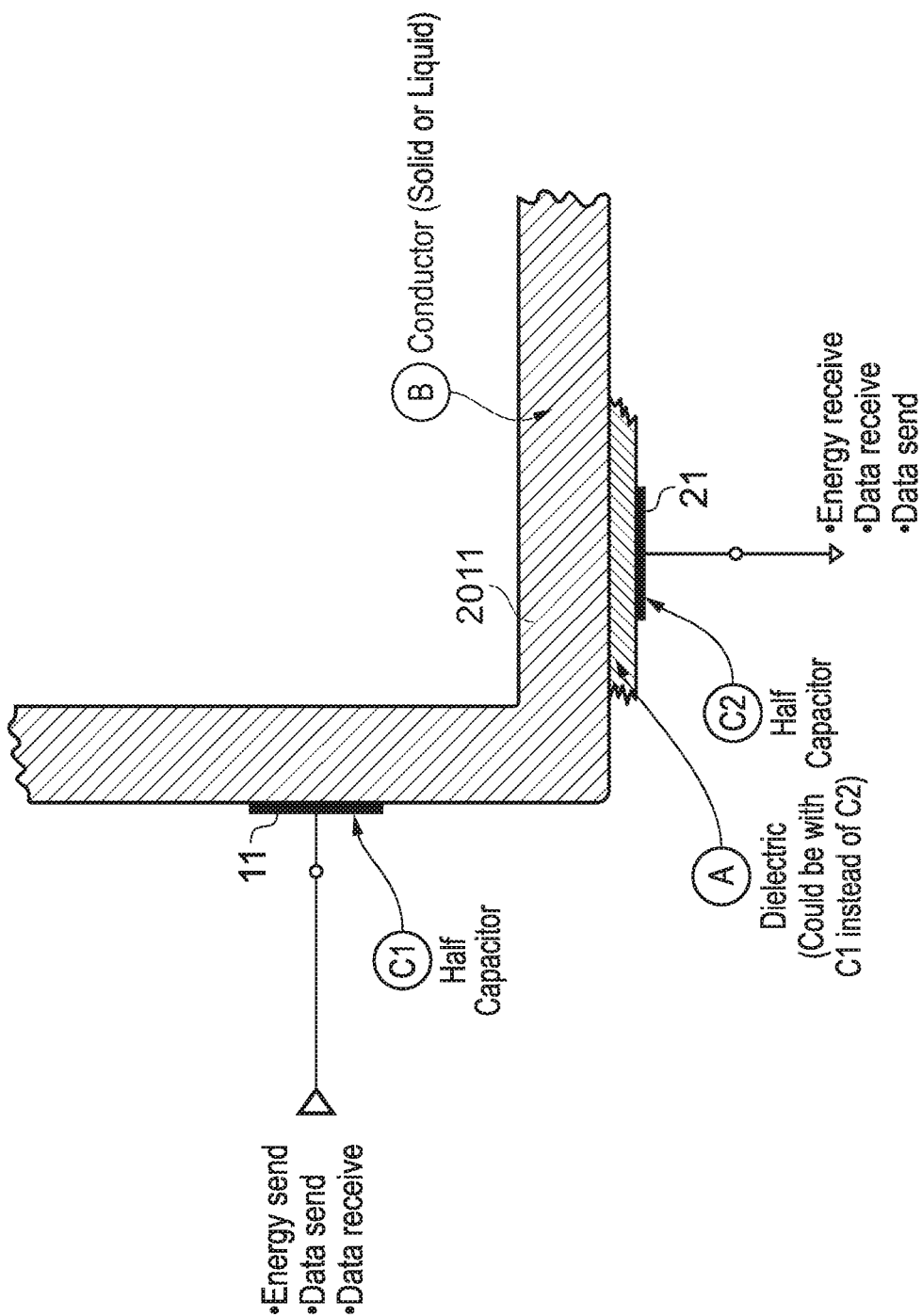

Referring now to FIG. 28, this shows a system similar to that shown in FIG. 27, but incorporating only one dielectric. Indeed, only one of the half capacitor armatures needs to have a dielectric position between itself and the metal container wall 2011 for the proximity field communication to work.

Figure 29:
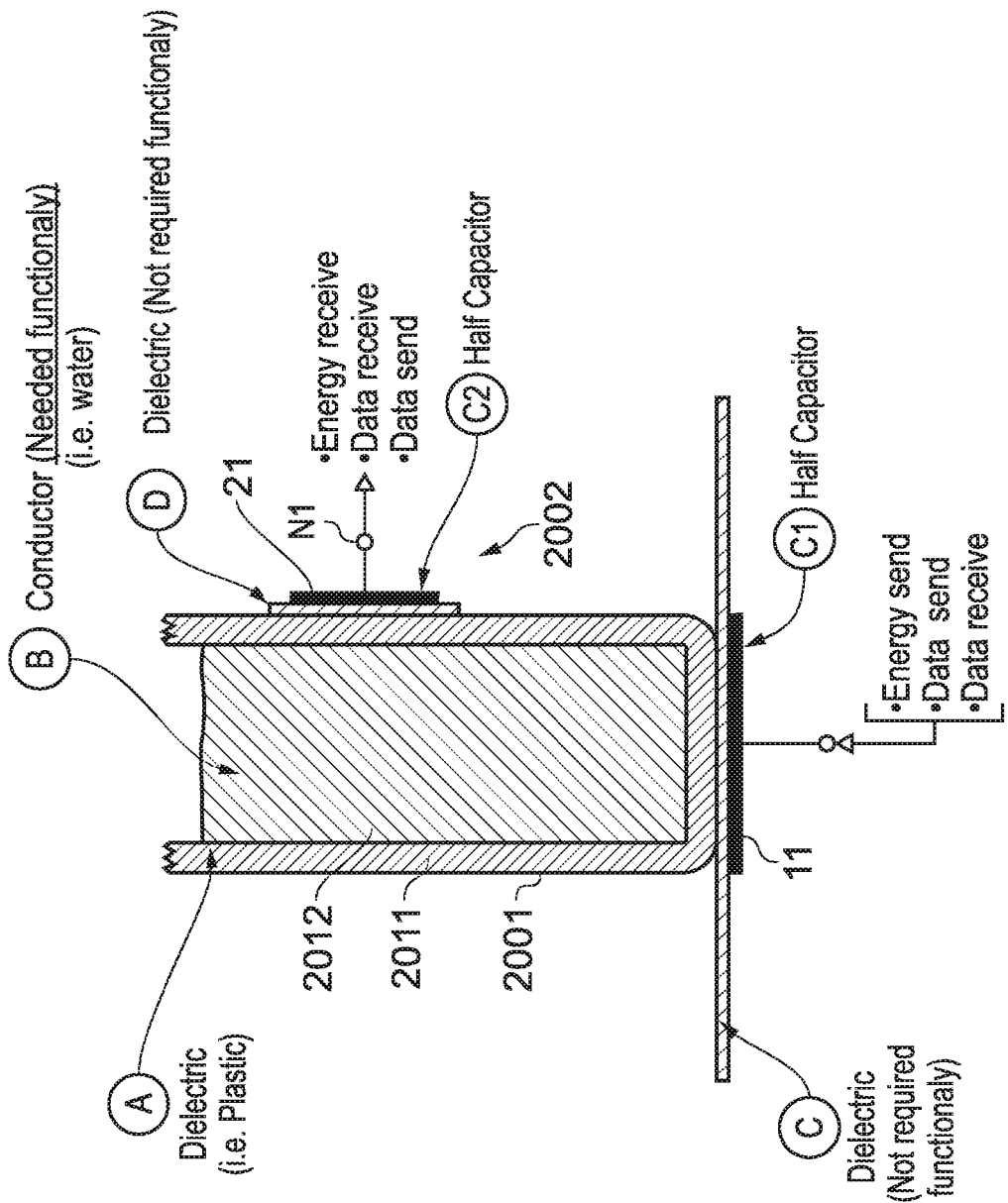

Referring now to FIG. 29, this shows another system embodying the invention. Here the first moveable entity portion is a plastic container (bottle) having a plastic wall 2011 and filled, at least partly, with contents 2012. The "transmitter" electrode 11 is arranged at the base of the container, and the "receiver" electrode 21 is attached to a side of the container and has the form of a label. The label includes a dielectric layer arranged between the container wall and the electrode 21. The label also comprises the circuitry connected to the capacitor plate 21, although the circuitry is not shown in the figure. In this arrangement, the liquid 2012 inside the container is part of the proximity field communication system, and is needed to operate. This principle can also be used for level detection.

Figure 30:
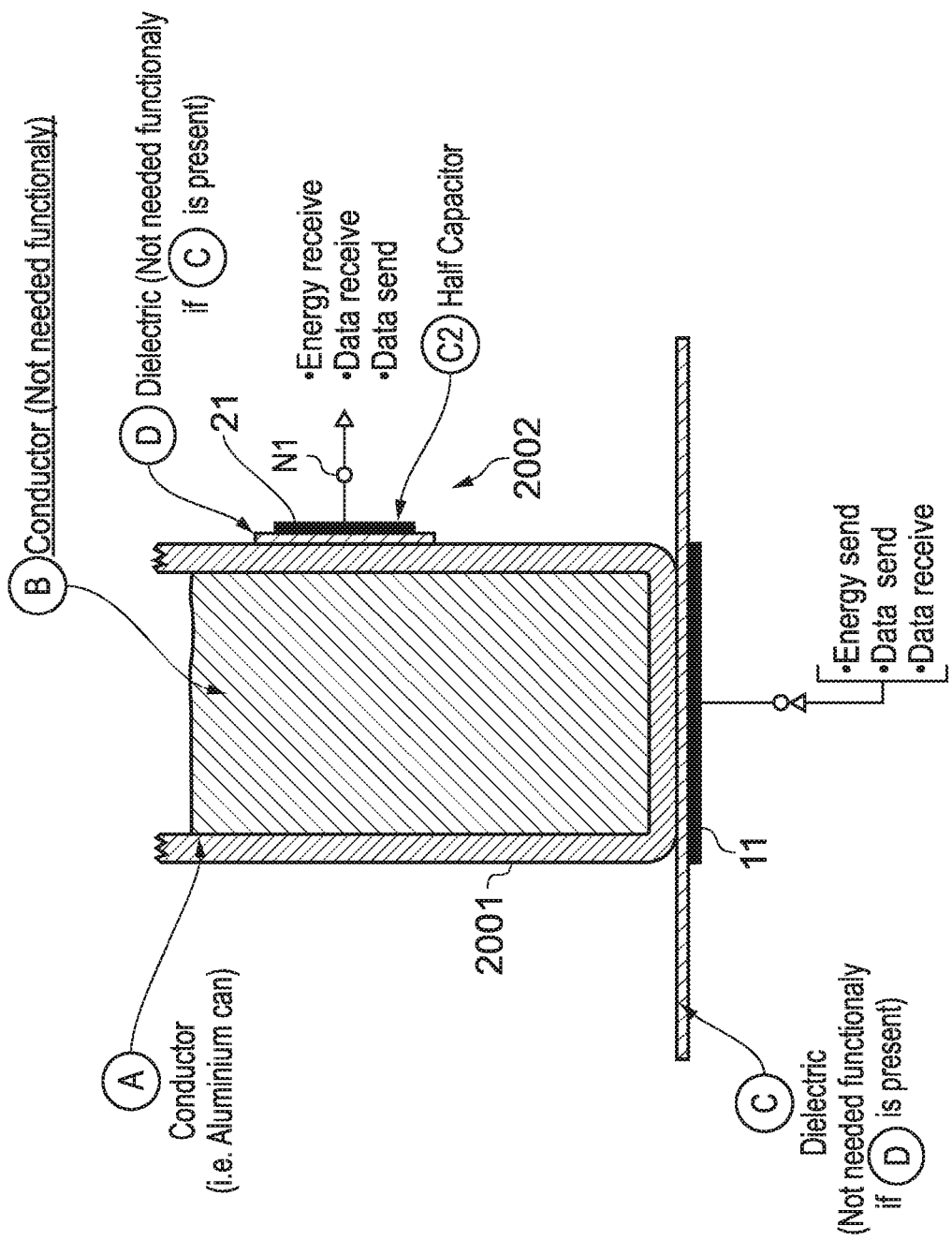

Referring now to FIG. 30, this shows another system embodying the invention where the first moveable entity first portion is a metal container (e.g. an aluminium can) and again the second portion of the moveable entity is in the form of a label comprising the electrode 21 and associated circuitry (not shown in the figure). Here, the liquid inside the container is not part of the proximity field communication system, so the system will work even if the container is empty. In other words, the metal wall of the container 2001 provides sufficiently good coupling between the capacitor plate 11 and 12, even without the presence of any contents inside the container. Thus, the metal container is part of the proximity field communication system, creating an intermediate capacitor armature between plates 11 and 21.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A system comprising a base and at least a first moveable entity, the first moveable entity being separate to and freely moveable with respect to the base and positionable in at least a first position with respect to the base,
    the base comprising at least a first base electrode, and the moveable entity comprising at least a first moveable entity electrode, and
    the first base electrode and the first moveable entity electrode being arranged to couple to form a first capacitor when the first moveable entity is in the first position,
    the base further comprising signal supply means, arranged to supply a first time-varying electrical Signal to the first base electrode, and
    the first moveable entity further comprising circuitry connected to the first moveable entity electrode,
    wherein the base is arranged to power the circuitry via the time-varying electrical signal and the coupling between the first base electrode and the first moveable entity electrode when the first moveable entity is in the first position, and
    wherein the time-varying electrical signal carries data and the circuitry is arranged to detect the data when the first moveable entity is in the first position.

2. A system in accordance with claim 1, wherein the base further comprises Signal detection means arranged to detect an electrical signal from the first base electrode.

3. A system in accordance with claim 2, wherein the signal detection means is adapted to determine whether the first moveable entity is in the first position from the electrical signal from the first base electrode.

4. A system in accordance with claim 2, wherein the signal detection means is adapted to determine an identity of the first moveable entity when the first moveable entity is in the first position from the electrical signal from the first base electrode.

5. A system in accordance with claim 2, wherein the circuitry is arranged to provide a second time-varying electrical signal to the first moveable entity electrode, the second time-varying electrical signal carrying second data, and the signal detection means is adapted to detect the second data when the first moveable entity is in the first position.

6. A system in accordance with claim 1, wherein the circuitry comprises:
    a first node, connected to the first moveable entity electrode, a second node, and a third node;

a first diode connected between the first node and the second node to allow current flow from the first node to the second node and block current flow from the second node to the first node; and a second diode connected between the third node and the first node to allow current flow from the third node to the first node and block current flow from the first node to the third node.

7. A system in accordance with claim 6, wherein the circuitry further comprises a second capacitor connected between the second node and the third node.

8. A system in accordance with claim 7, wherein a voltage is developed across the second capacitor in response to the first time-varying electrical signal being applied to the first base electrode when the first moveable entity is in the first position.

9. A system in accordance with claim 6, wherein the circuitry further comprises a resistor connected between the second node and the third node.

10. A system in accordance with claim 9, wherein an electrical current is driven through the resistor in response to the first time-varying electrical signal being applied to the first base electrode when the first moveable entity is in the first position.

11. A system in accordance with claim 6, wherein the circuitry further comprises data detection means connected to the second and third nodes and adapted to detect data carried by the first time-varying electrical signal from a signal developed between the second and third nodes when the first moveable entity is in the first position.

12. A system in accordance with claim 6, wherein the circuitry further comprises data transmission means connected to the second and third nodes and adapted to supply a second time-varying electrical signal carrying second data to the first moveable entity electrode.

13. A system in accordance with claim 11, wherein the circuitry further comprises power supply circuitry connected to the second and third nodes, adapted to receive power via the second and third nodes when the first moveable entity is in the first position, and adapted to power at least one of the data detection means and the data transmission means using the received power.

14. A system in accordance with claim 1, wherein the first moveable entity comprises a first portion, and a second portion attached to the first portion, wherein the second portion comprises the first moveable entity electrode and the circuitry.

15. A system in accordance with claim 14, wherein the second portion is a label attached to a surface of the first portion.

16. A system in accordance with claim 14, wherein the first portion comprises a container.

17. A system in accordance with claim 16, wherein the container is one of: a plastic container, and a metal container.

18. A system in accordance with claim 16, wherein the container is at least partly filled with liquid or solid contents.

19. A system in accordance with claim 14, wherein the coupling between the first base electrode and the first moveable entity electrode to form the first capacitor is at least partly via the first portion.

20. A system in accordance with claim 19, wherein the first portion comprises a container having a wall, and optionally at least partly filled with contents, and the coupling is at least partly via the wall, and optionally at least partly via the contents.

* * * * *